US007967878B2

(12) United States Patent
Johnston

(10) Patent No.: US 7,967,878 B2
(45) Date of Patent: Jun. 28, 2011

(54) REFORMER APPARATUS AND METHOD

(75) Inventor: Anthony M. Johnston, Double Bay (AU)

(73) Assignee: Meggitt (UK) Limited, Christchurch, Dorset (GB)

( * ) Notice: Subject to any disclaimer, the term of this patent is extended or adjusted under 35 U.S.C. 154(b) by 897 days.

(21) Appl. No.: 11/818,916

(22) Filed: Jun. 16, 2007

(65) Prior Publication Data
US 2008/0124255 A1 May 29, 2008

Related U.S. Application Data

(63) Continuation-in-part of application No. 10/500,176, filed as application No. PCT/AU03/00022 on Jan. 3, 2003, now Pat. No. 7,276,214.

(30) Foreign Application Priority Data

Jan. 4, 2002 (AU) .................................... PR9817

(51) Int. Cl.
*B01J 19/00* (2006.01)
(52) U.S. Cl. ............. 48/61; 422/149; 422/601; 429/416
(58) Field of Classification Search ........... 422/188–195
See application file for complete search history.

(56) References Cited

U.S. PATENT DOCUMENTS

| 2,676,156 | A | 4/1954 | Bailey |
| 4,516,632 | A | 5/1985 | Swift et al. |
| 4,569,391 | A | 2/1986 | Hulswitt et al. |
| 5,068,058 | A | 11/1991 | Bushinsky et al. |
| 5,209,906 | A | 5/1993 | Watkins et al. |
| 5,324,452 | A | 6/1994 | Allam et al. |
| 5,733,347 | A | 3/1998 | Lesieur |
| 6,048,472 | A | 4/2000 | Nataraj et al. |
| 6,117,578 | A | 9/2000 | Lesieur |
| 6,214,066 | B1 | 4/2001 | Nataraj et al. |

(Continued)

FOREIGN PATENT DOCUMENTS

DE 43 13 723 A1 11/1994

(Continued)

OTHER PUBLICATIONS

R. T. Ogulata and F. Doba, Experiments and Entropy Generation Minimization Analysis of a Cross-Flow Heat Exchanger, Int. J. Heat Mass Transfer, vol. 41, pp. 373-381, 1998, printed in Great Britain.

(Continued)

*Primary Examiner* — Alexa D Neckel
*Assistant Examiner* — Imran Akram
(74) *Attorney, Agent, or Firm* — Jones Day

(57) ABSTRACT

A multiple adiabatic bed reforming apparatus and process involving stage-wise combustion and multiple reforming chambers. Co-flow and cross-flow occurs under laminar flow conditions. A reformer suitable for small scale production as well as large scale production. A passive stage-by-stage fuel distribution network suitable for low pressure fuel wherein the resistances in successive fuel distribution lines control the amount of fuel delivered to each combustion stage. Heat is captured from reforming syngas product to preheat gases before entering the reformer. Conditions that would produce unwanted coking or metal dusting are avoided or localized away from the heat exchangers to locations which can be cost effectively protected. A chemical reactor which has a core composed of a stack of metal plates that are diffusion bonded in face-to-face relationship.

19 Claims, 28 Drawing Sheets

U.S. PATENT DOCUMENTS

| | | |
|---|---|---|
| 6,296,679 B1 | 10/2001 | Kato |
| 6,447,736 B1 | 9/2002 | Autenrieth et al. |
| 6,562,105 B2 | 5/2003 | Gottzmann |
| 6,695,983 B2 | 2/2004 | Prasad et al. |
| 6,892,802 B2 | 5/2005 | Kelly et al. |
| 6,893,619 B1 | 5/2005 | James et al. |
| 7,008,707 B2 | 3/2006 | Goebel |
| 7,101,175 B2 | 9/2006 | Deshpande et al. |
| 7,128,769 B2 | 10/2006 | Renn |
| 2002/0071797 A1* | 6/2002 | Loffler et al. ............... 422/190 |
| 2003/0049184 A1* | 3/2003 | Kimata et al. ............... 422/188 |
| 2003/0103878 A1* | 6/2003 | Morse et al. ............... 422/198 |
| 2003/0154654 A1 | 8/2003 | Goebel |
| 2007/0000176 A1 | 1/2007 | Liu et al. |

FOREIGN PATENT DOCUMENTS

| | | |
|---|---|---|
| EP | 0 430 184 B1 | 9/1993 |
| EP | 0 926 097 B1 | 9/2003 |
| EP | 1 403 215 A1 | 3/2004 |
| GB | 671 573 A | 5/1952 |
| GB | 2 333 351 A | 7/1999 |
| WO | WO 97/21064 | 6/1997 |
| WO | WO 01/54806 A1 | 8/2001 |
| WO | WO 02/28769 A2 | 4/2002 |

OTHER PUBLICATIONS

A. Hofmann, The Cross-Flow Heat Exchanger in Comparison, Heat and Mass Transfer, vol. 40, pp. 903-907, 2004.

Th. Bes, Thermal Performances of Codirected Cross-Flow Heat Exchangers, Heat and Mass Transfer, vol. 31, pp. 215-222, 1996.

David Reay, Learning from Experiences with Compact Heat Exchangers, Caddet Energy Efficiency Analyses Series, Newsletter No. 4, 1999.

PCT, International Preliminary Examination Report, Jul. 1, 2003, International Application No. PCT/AU03/00022, Australian Patent Office.

PCT, International Search Report, May 21, 2001, International Application No. PCT/GB01/00258, European Patent Office.

PCT, International Search Report, Feb. 27, 2003, International Application No. PCT/AU03/00022, Australian Patent Office.

PCT, International Search Report, Jul. 21, 2008, International Application No. PCT/AU2008/000870, Australian Patent Office.

PCT, Written Opinion of the International Searching Authority, Jul. 28, 2008, International Application No. PCT/AU2008/000870, Australian Patent Office.

* cited by examiner

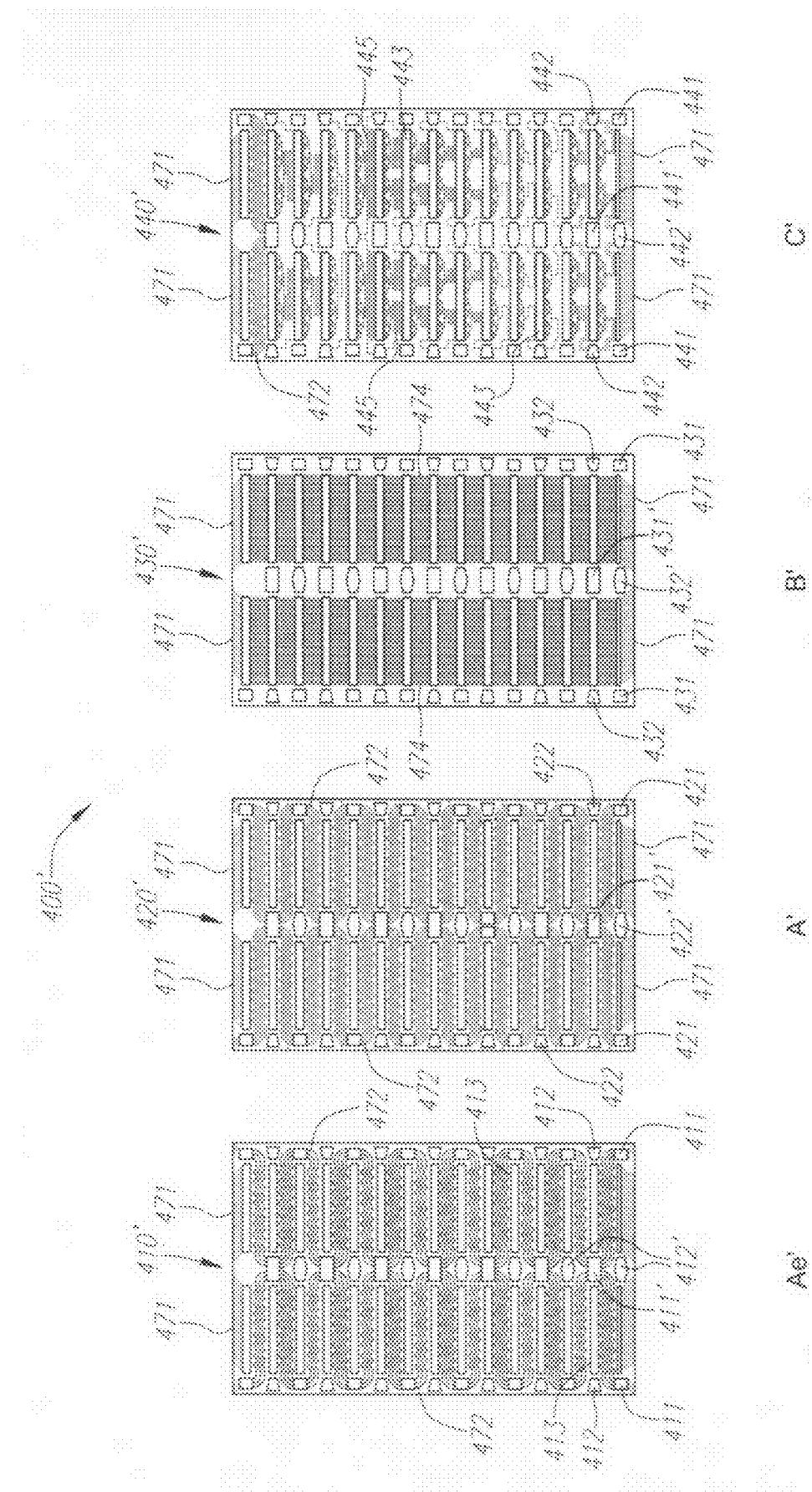

REFORMER APPARATUS AND METHOD

CROSS REFERENCE TO RELATED APPLICATIONS

This application is a continuation-in-part of U.S. Ser. No. 10/500,176, filed Jan. 10, 2005 now U.S. Pat. No. 7,276,214 entitled Chemical Reactor, which claimed priority to PCT Application No. PCT/AU03/00022, filed Jan. 3, 2003, which application claimed priority to Australian Patent Application No. PR 9817, filed Jan. 4, 2002, the entirety of each of which is incorporated herein by reference.

FIELD OF THE INVENTION

The invention generally relates to an improved reformer apparatus and method, including a multiple adiabatic bed reformer that is more efficient and suitable for smaller scale production of gases than are tubular reforming systems. More specifically, the invention relates to improved fuel efficiency, the reduction, avoidance or localizing of metal dusting conditions, distribution of fuel to the system and improved fluid flow configurations during reforming and heat exchange.

This invention in broad terms also relates to an apparatus for use in, and a method of, effecting a chemical reaction. In one embodiment, the invention has been developed in relation to a steam methane reformer for use in association with a proton exchange membrane fuel cell and the invention is herein described in that context. However it will be understood that both the apparatus and the method of the invention do have broader applications, to other reactive processes.

BACKGROUND OF THE INVENTION

Reforming, such as steam reforming, is a catalytic reaction in which a mixture of steam and hydrocarbons are exposed to a catalyst under specified conditions to produce a mixture of carbon oxides and hydrogen. This resultant mixture is commonly known as syngas.

Syngas can then be further processed using conventional methods into several products, such as hydrogen, methanol, and ammonia, which have many industrial and commercial uses.

The basic chemical reactions that result in the production of syngas, and the further processing of syngas into other products, have been well known for many years. Indeed, reforming has been long and widely practiced on a large, industrial scale.

Industrial steam reformers are generally of a tubular construction, in which one or more (usually at least several) large elongate metal tubes are packed with the reforming catalyst. The reformate mixture is then caused to flow through the tubes, and hence coming into contact with the catalyst. Because the catalytic reaction in these processes requires added heat, some means to raise the reformate/catalyst system to the requisite temperature must be provided. In the typical tubular industrial reforming systems, the outer surface of the tubes is usually heated by a combination of convective and radiant heat transfer from some form of external combustion.

Thus, the successful operation of a tubular reformer relies on maintaining a somewhat delicate balance between the endothermic reforming reaction within the tubes and the heat transfer to the tubes from the external combustion process. Also, the provision of heat to the tubes must be uniformly controlled, as on one hand excessive heat input at any point might lead to hot spots on the tubes that could in turn lead to tube failure or "coking" of the hydrocarbon (which adversely affects the reforming process); or, on the other hand, inadequate heat input at some or all of the tube, which would result in low hydrocarbon conversion. Another important variable for these traditional reformers is pressure, and more specifically, pressure drops at various stages of the reforming process. Therefore, the operation of these large-scale tubular reformers has typically involved a rather complex control system comprising multiple control loops.

While these known large scale processes and equipment in which the processes have been carried out have generally worked well and cost-effectively, they have not proven effective for smaller scale reforming. Among other things, the costs to manufacture, install, maintain and operate these types of reformers on a smaller scale have been prohibitive. Therefore, smaller industrial and commercial applications have not been well-utilized.

In the past, smaller users of hydrogen, ammonia and methanol could not cost-effectively provide for on-site production of those products. Rather, such users would be required either to utilize other products which might not be optimal, or to have product delivered. For example, smaller users of hydrogen typically utilize the ubiquitous metal hydrogen-containing cylinders that are delivered by truck to the user's location. While this is a reliable source of the desired product, it is becoming less desirable as the price of vehicle fuel has dramatically increased, which in turn has driven up the cost of delivery and hence the cost of the product to the user. Also, many smaller users would prefer to have on-site production capability that will not only reduce cost over the longer run, but will also provide a captive source such that the user is not vulnerable to the vagaries of price, availability and delivery factors that are beyond the user's control.

Also, as the cost of traditional sources of energy has increased, the desire for a cost-effective alternative has risen.

Therefore, there has long existed a need for the ability to produce syngas on a smaller scale than has been cost-effectively possible with the heretofore used tubular systems, and that need continues to escalate. Providing such a solution, however, is neither easy nor obvious. Not only must such a smaller-scale operation be capable of cost-effective production of syngas in smaller quantities, but the operation of the system must be relatively simple, as the on-site production by most users will be a side-line operation, such that an overly complex system (with many control loops and sub-systems) that would require extensive training and expertise, and constant oversight during operation, would indirectly and adversely affect the cost efficiencies that on-site production is to achieve.

In other words, the preferred system will utilize passive controls at as many of the system's component aspects as possible, rather than requiring extensive control mechanisms and/or operator oversight. Because, however, the reforming process inherently includes multiple constituent products being subjected to high heat and potentially high pressure, whereas various aspects of the overall system are most cost-effectively conducted at relatively low pressures (for example, avoiding fuel and combustion air compression), providing a system that can be more than less passively controlled has proven to be a challenge.

Additionally, because a major component of any reforming operation is the provision of heat, cost effectiveness on a smaller scale requires that the efficiency of the process in terms of output per applied heat be high. This efficiency has proven difficult to achieve in smaller scale reformers, and would require that the heat generated by the system be effectively captured and reused.

Also, the on-site user will typically be utilizing the output of the system for personal consumption and use (as opposed to a larger scale production in which the production of syngas and one of the further refined products is itself the mainstay of the business). Therefore, while the larger producer will typically be operating the system at near maximum capacity for long periods of time, or even more or less continuously, it is unlikely that the smaller user will want the reforming process to be operating at maximum output continuously, or even most of the time. Rather, the smaller user may want to increase production as needed, and then reduce production during periods of low demand.

Yet, because traditional reformers require the maintenance of a balance of various factors for optimal (actually, even successful) operation, repeatedly turning the system completely off, to be restarted when the need for more product later arises, is not preferred. Therefore, the preferred smaller-scale reformer would provide the operator not only with the ability to turn production up and down as required by the user's on-site needs, but also allow the operator to reduce production to a very low level easily and without major control issues, and without having to completely turn the process off, only to have to re-start the process from standstill condition at some later time.

The preferred smaller-scale reformer should also avoid or minimize upkeep and repair. For example, a problem often encountered in any reforming operation is a condition or reaction called "metal dusting," which causes the exposed metal in the reforming system to flake off metal particles, and if sufficiently severe, ultimately to fail altogether. Because it is difficult to exclude in any reforming process the conditions that will be conducive to metal dusting, it is particularly important in a reforming apparatus that the process control and localize metal dusting to the extent possible.

Another problem that can be encountered even in the smaller scale systems is coking. Coking occurs when the reactants within the system are subjected to a confluence of pressure and temperature conditions. Thus, the smaller systems must also address and avoid this potential problem.

A significant cost item in any reforming process is the catalyst utilized, both in chemical type of catalyst, and also in the form in which the catalyst is delivered and utilized in the system. For example, in the large scale reformers, large catalyst particles are usually employed for various reasons, some having to do with pressure and pressure drop issues in the system, and others having to do with the desired efficiency of output of the syngas, as the type and form of catalyst plays and integral role in the overall efficiency of production.

In a reformer and reforming process primarily intended for the smaller user, however, utilizing exotic, more expensive catalysts will not be preferred, nor will the larger particles be particularly well-adapted for use in a smaller-size apparatus. Accordingly, the preferred system will be able to use the more commonly available, off-the-shelf catalysts that are carried on a more varied and smaller size medium than is traditionally used in the large scale reformers. The preferred system will also use as a fuel source natural gas that is widely available.

As result of the drawbacks in the prior art reformers and the issues that arise when those systems are considered as a starting point for scaling down for lower production users, some consideration has been given to the possible development of an alternative to the tubular reformers; that is, to the use of so-called printed circuit heat exchanger ("PCHE") cores and to the deposition of thin layers of reforming catalyst into channels of plates that form the cores. The PCHE cores currently are used in heat exchangers, and they are constructed by etching channels having required forms and profiles into one surface of individual plates which are then stacked and diffusion bonded to form cores having dimensions required for specific applications.

However, whilst this alternative approach does indicate some merit, several problems are foreseen, including the following:

Difficulties in obtaining adhesion of catalyst to the metal (plate) substrate,

Limited catalyst life,

Difficulties in replacing the catalyst, and

Coupling of heat transfer and catalyst areas, this requiring very high-activity catalyst if over-investment in heat exchange surface is to be avoided.

A partial solution to these problems is revealed in United States Patent Publication US2002/0018739 A1, dated 14 Feb. 2002, which (without constituting common general knowledge or prior art) discloses a chemical reactor having a PCHE-type core. The core is constructed with alternating heat exchange and catalyst-containing zones that together form a passageway for a reactant. Each of the heat exchange zones is formed from stacked diffusion bonded plates, with some of the plates providing channels for (externally heated or cooled) heat exchange fluid and others of the plates providing orthogonally directed channels to carry the reactant from one catalyst-containing zone to the next such zone.

However, this arrangement has not proven sufficiently cost-effective and sufficiently simple to use as to provide a solution for the smaller-user.

Thus, there remains a long felt, and until now, unfulfilled, need in the art for a reforming process and apparatus that can be utilized by the smaller user and that will accomplish the multiple goals of being sufficiently cost efficient, easy to operate, monitor, maintain and control, and still provide high quality and quantity of syngas that will allow the smaller user to produce, on site, hydrogen, methanol and/or ammonia at the times required on-site.

SUMMARY OF THE INVENTION

In the preferred aspect of the invention, a multiple adiabatic bed reforming apparatus and process are disclosed in which stage-wise combustion, in combination with multiple reforming chambers that contain the catalyst, utilize both co-flow and pure cross-flow of the combustion and reforming gases (that is, eliminating any use of counter-flow) under laminar flow conditions to provide a reformer than can be effectively utilized for smaller production situations.

A passive stage-by-stage fuel distribution network suitable for use with low pressure fuel is incorporated, and the resistances within the fuel distribution network are tailored such that the amount of fuel delivered to each successive combustion stage diminishes in a predetermined and precise amount relative to the one before and the one after throughout the length of the reformer despite the fact that the pressure drop that drives the fuel flow increases. Because of this control of fuel distribution, and because the flows within the combustion and fuel passages are maintained in laminar (as opposed to turbulent) flow, the flows of the fuel and air at each stage remains relatively constant during severe "turn up" and "turn down" conditions. This system of stage-wise fuel distribution also eliminates the need for multiple control loops, and allows the operator effectively to control the entire reforming aspect of the system through monitoring and control of a very limited number of process variables.

The use of variable fuel addition to each stage, which allows for the tapering off of fuel addition to later stages, also limits the metal temperatures required in order to achieve a given and desired syngas temperature, thus providing optimized reforming conditions. High efficiency is achieved by capturing and utilizing the heat from the produced syngas in a multiple-steam heat exchanger to pre-heat the gases before entering the reforming process steps, and is also utilized to produce steam for use in the process.

The preferred process and apparatus of this invention is also effective to eliminate the conditions that would produce unwanted coking, and to localize the areas where conditions that can cause metal dusting occur, by controlling the temperature of the gases either above or below the temperature at which metal dusting occurs to very specific locations within the apparatus, which locations are outside of the heat exchangers, and reforming chambers, and which locations can be cost-effectively protected by use of materials that will not be susceptible to metal dusting.

While the aspects of this preferred embodiment of the invention have been described in terms of their utilization for small-scale production, the invention is not so limited. These same inventive concepts can be used for the production of large scale quantities of syngas, and the process and apparatus herein disclosed can be effectively scaled up as the user's need for product increases.

Another embodiment of the inventive concepts herein disclosed is directed to a development which alleviates at least some of the problems of tubular reformers and which facilitates or extends, in a novel way, the use of PCHE cores in chemical reactors.

This aspect of the invention disclosed below may be defined broadly as providing a chemical reactor comprising:
  a) a core composed of at least one stack of metal plates bonded in face-to-face relationship,
  b) a plurality of reaction zones located within the core,
  c) a plurality of catalyst receiving zones located within the core,
  d) a first channel arrangement provided in at least some of the plates for transporting a first reactant to and between the reaction zones, portions of the first channel arrangement that interconnect the reaction zones being formed over at least a portion of their length as heat exchange channels,
  e) a second channel arrangement provided in at least some of the plates and arranged to deliver a second reactant to each of the reaction zones, and
  f) a third channel arrangement provided in at least some of the plates for transporting a third reactant to and between the catalyst receiving zones, portions of the third channel arrangement that interconnect the catalyst receiving zones being formed over at least a portion of their length as heat exchange channels that are positioned in heat exchange proximity to the heat exchange channels of the first channel arrangement.

This aspect of the invention may also be defined in broad terms as providing a method of effecting a chemical reaction by:
  directing a first reactant into and serially through the reaction zones in the above defined reactor by way of the first channel arrangement,
  directing a second reactant in parallel feeds into the reaction zones by way of the second channel arrangement, the second reactant being selected to react exothermically with the first reactant in the respective reaction zones, and concurrently directing a third reactant into and serially through a catalyst contained in the catalyst receiving zones by way of the third channel arrangement and, in so doing, exposing the reactant to heat from the product of the exothermic reaction in its passage through the heat exchange channels of the first channel arrangement.

Depending upon the process, the reaction zones may also be charged with a catalyst that is selected to provide for catalytic reaction (e.g., combustion) of the first and second reactants.

OTHER OPTIONAL FEATURES OF THE INVENTION

The core of the above defined reactor may be constructed from plural stacks of the metal plates and, in such a case, the adjacent stacks may be spaced apart by interconnecting walls that define the reaction zones and the catalyst receiving zones. Such an arrangement is considered to be especially suitable for large capacity reactors.

However, for at least some reactors, the core may comprise a single stack of metal plates. In this case each of the reaction zones will be defined by aligned apertures in adjacent ones of the plates and each of the catalyst receiving zones will similarly be defined by (further) aligned apertures in adjacent ones of the plates.

The number of reaction zones within the core may be the same as or different from the number of catalyst receiving zones. In a specific embodiment of the invention the reaction zones are arrayed in two parallel rows, with the first channel arrangement extending linearly between the reaction zones. Also, in this case, the catalyst receiving zones may be arrayed in three parallel rows, one of which is located between of the rows of reaction zones and the other two of which are located outside of the rows of reaction zones.

For some applications of the invention the metal plates may be stacked in repeating groups of three superimposed plates, with one of the three plates being formed with the first channel arrangement for transporting the first reactant to and between the reaction zones, a second of the three plates being formed with the second channel arrangement for delivering the second reactant to the reaction zones and the third plate of each group being formed with the third channel arrangement for transporting the third reactant through the catalyst receiving zones.

In order to optimize heat transfer between the product of the exothermic reaction and the third reactant, the first and third plates may be diffusion bonded in face-to-face contacting relationship.

In other applications of the invention, for example when the reactor embodies or is constructed as a reformer, it may be necessary or desirable to exchange heat between portions of the (same) reactant stream that are at different processing stages. Also, it may be desirable in some cases to allocate a single processing function to two or more plates and/or to increase the number of plates for the purpose of optimizing heat exchange. In such cases it will be necessary to stack the plates in repeating groups of four or more plates. The order in which the plates of each group will be interleaved and diffusion bonded will be dependent upon the requirements of specific processes and channel formats embodied in the plates.

Embodiments of the invention have applications in any process that requires catalytic conversion of a reactant and heating of the reactant between catalytic reaction stages. However, in a specific embodiment of the invention the reactor comprises or incorporates a reformer such as a steam methane reformer for use in association with a proton exchange membrane fuel cell or other application requiring hydrogen or syngas. In such case the reactor may be incorporated in a fuel processor that may include at least one pre-reformer that is arranged to be heated by hot syngas, at least one pre-reformer that is arranged to be heated by hot flue gas and, as portions of the reactor, multiple reformers arranged to be heated indirectly by catalytic combustion of, for example, anode off-gas. In this arrangement the first reactant may comprise a combustion supporting gas and the second reactant may comprise a combustible gas such as anode off-gas.

The fuel processor, of which the reactor may be a part, may also incorporate ancillary processing stages, including cooling and pre-heating stages, water-gas shifting and CO oxidation. Some or all of these stages may be incorporated in a further core (or further cores) that is (or are) similar to the reactor core, the further core(s) having appropriate channel arrangements in stacked metal plates.

The various aspects of the invention herein disclosed and claimed will be more fully understood from the following description of the specific embodiments of a reactor in the form of a steam methane reformer that is incorporated in a fuel processor. The description is provided with reference to the accompanying drawings.

BRIEF DESCRIPTION OF THE DRAWINGS

In the drawings:

FIG. 28 shows plates for use in a stack of plates comprising a reformer wherein the plates are in a side-by-side configuration.

DETAILED DESCRIPTION OF PREFERRED EMBODIMENT

Figure 1:
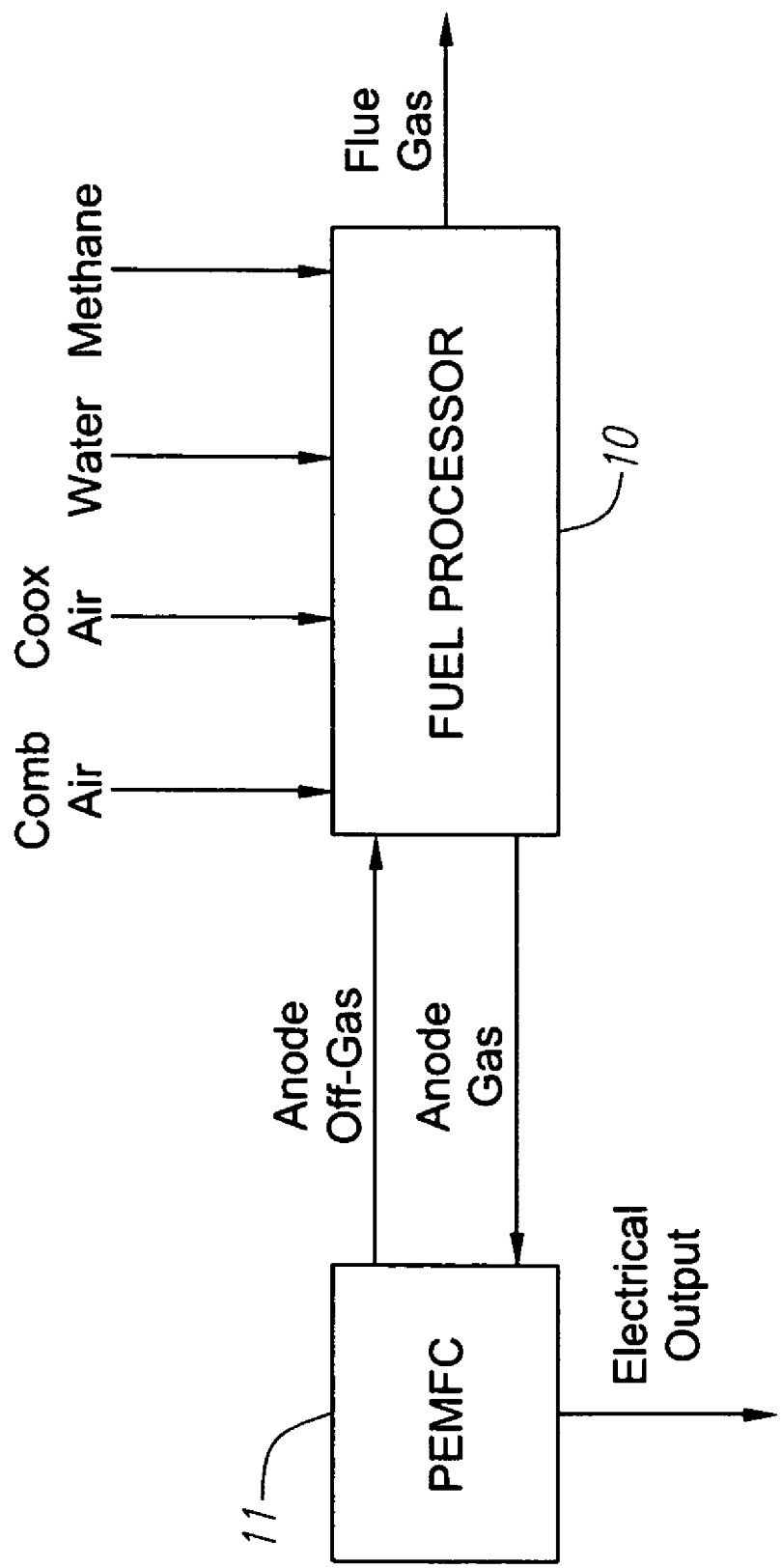
FIG. 1 shows a diagrammatic representation of the fuel processor connected to an associated proton exchange membrane fuel cell ("PEMFC").
Figure 2:
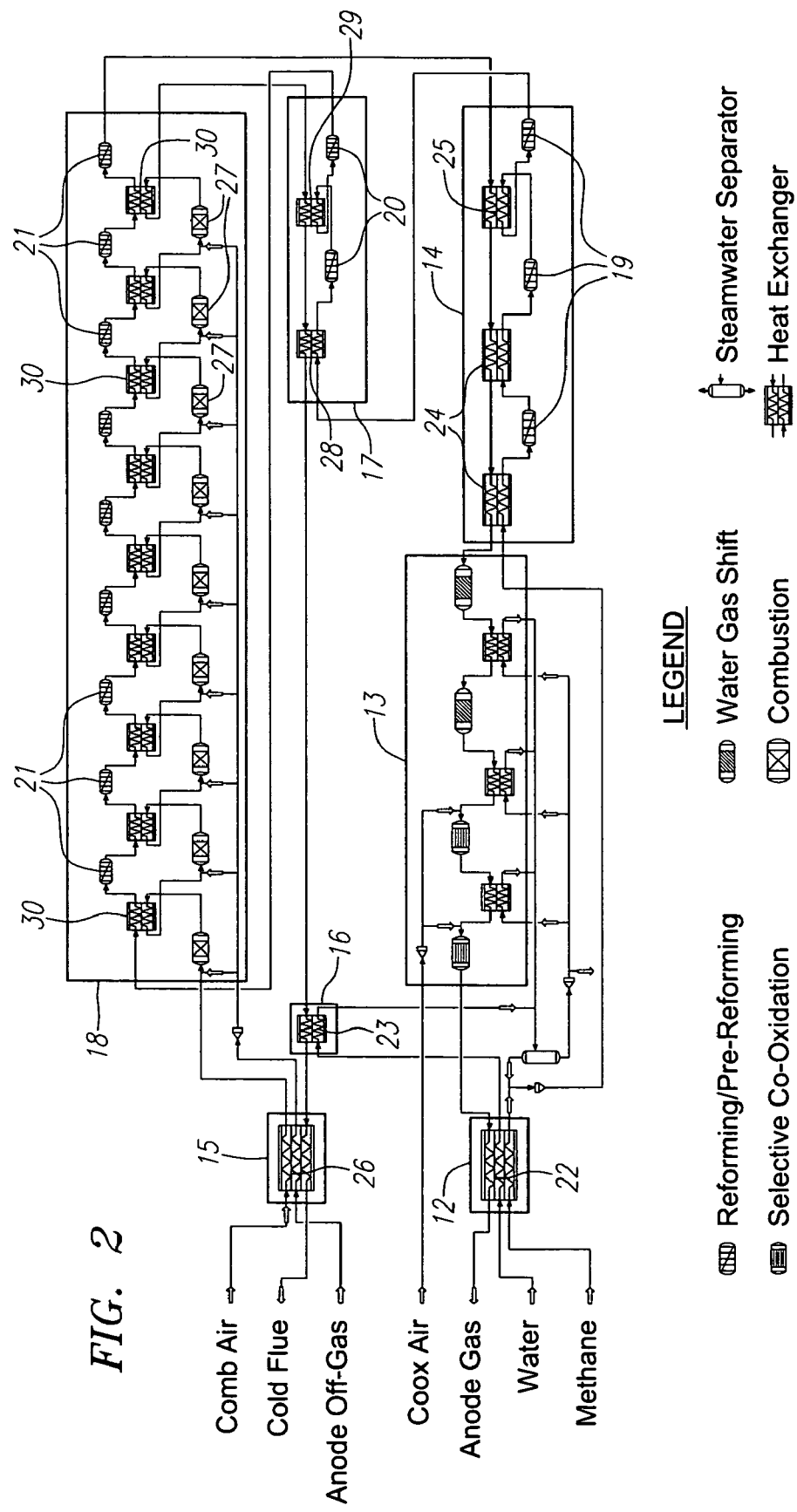
FIG. 2 shows a diagrammatic representation of the fuel processor shown in FIG. 1, including a reactor having reforming and pre-reforming stages.

As shown in FIGS. 1 and 2, the fuel processor 10 is in use connected to a PEMFC 11, and pipework indicated by the arrowed connections is provided to deliver the various indicated fluids (this term embracing both liquids and gases in this specification) to and from the fuel processor. The fuel processor 10 is shown in block-diagrammatic form in FIG. 2 but, as will be described later, portions of the fuel processor are embodied in a single core that is composed of diffusion bonded plates.

The fuel processor 10 may be considered as including seven notionally separate portions or modules 12 to 18 that provide the following functionality:

12—Anode gas cooling.
  Methane/Water pre-heating.
13—Syngas cooling/CO oxidation/Water Gas Shift (WGS).
  Water boiling.
14—Syngas cooling.
  Methane ("feed gas") pre-heat/pre-reforming.
15—Flue gas cooling.
  Anode off-gas ("fuel")/Air pre-heat.
16—Flue gas cooling.
  Water boiling.
17—Flue gas cooling.
  Feed pre-heat/pre-reforming.
18—Multi-stage combustion.
  Multi-stage heating of reactant.
  Multi-stage reforming.

Significant ones of these functions will be described in more detail later in this specification.

The feed gas is, as shown, subject to stepwise reforming involving:

Three pre-reformers 19 heated by hot syngas in portion 14,
Two pre-reformers 20 heated by hot flue gas in portion 17, and
Nine reformers 21, in reactor portion 18, that are heated indirectly by catalytic combustion of the anode off-gas.

Figure 3:
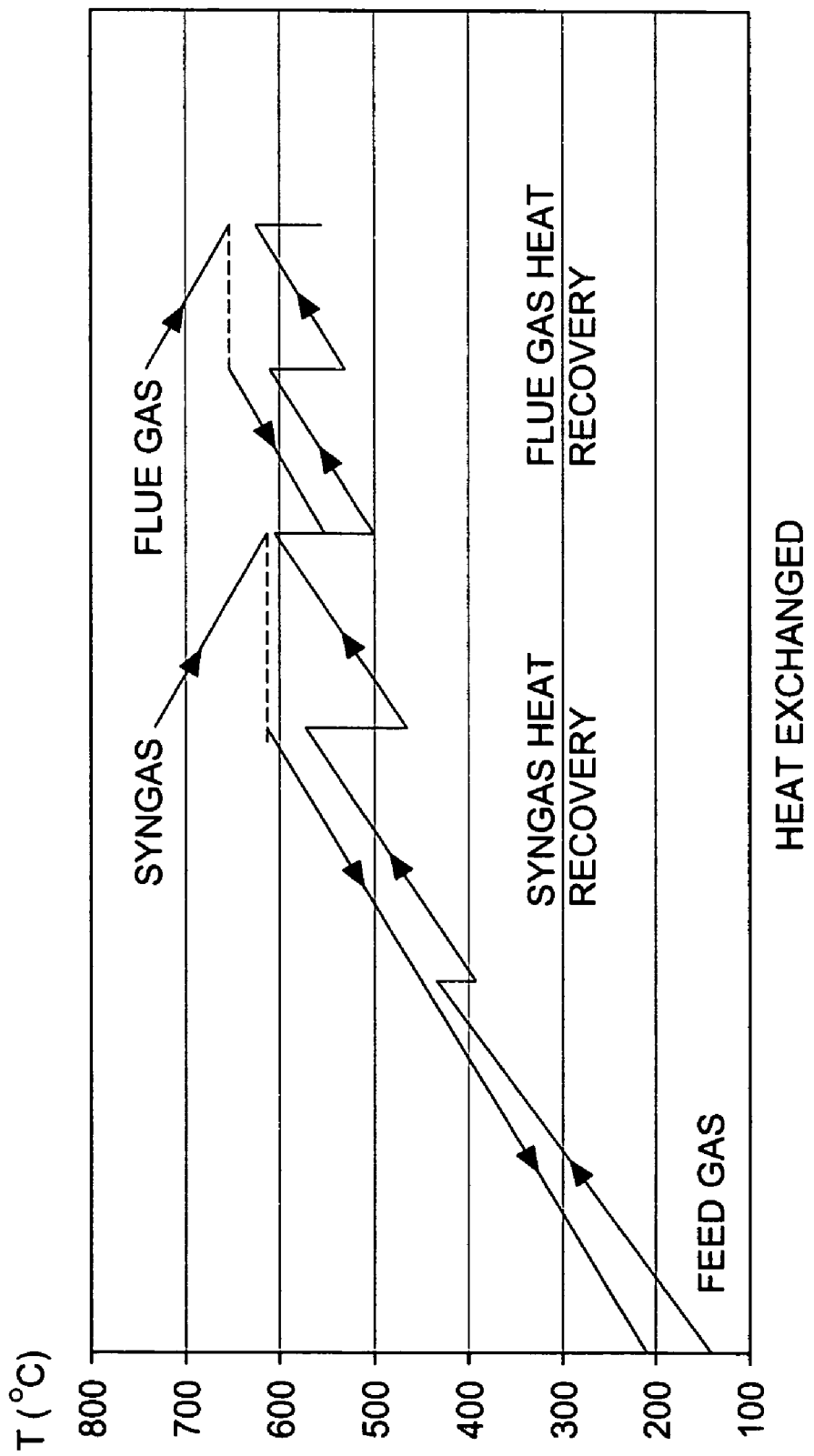
FIG. 3 shows a temperature profile of the pre-reforming stages.
Figure 4:
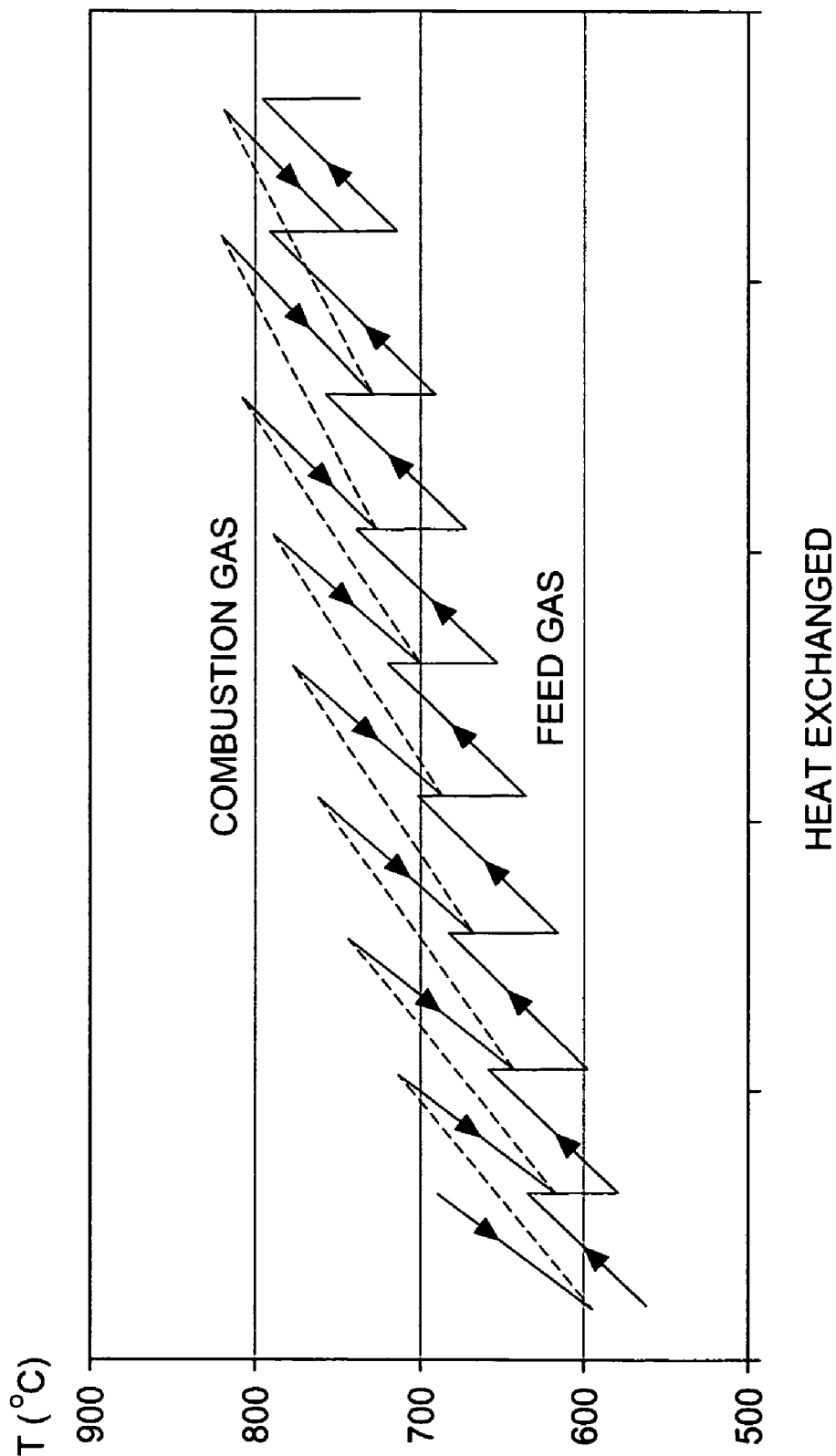
FIG. 4 shows a temperature profile of the reforming stages.
Figure 5:
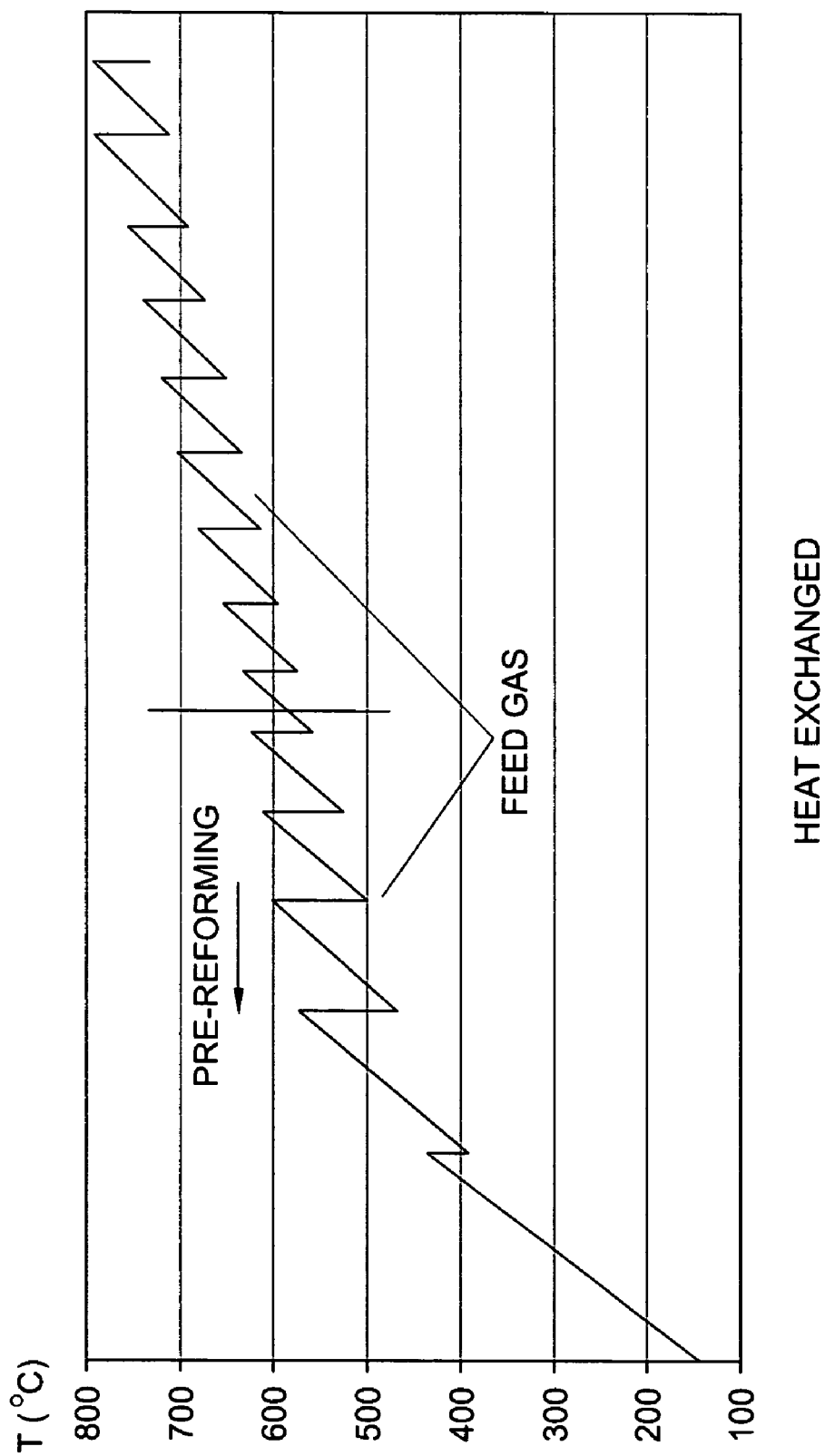
FIG. 5 shows a temperature profile of the combined pre-reforming and reforming stages.

The temperature profiles for the pre-reforming and reforming stages 19/20 and 21 are shown in FIGS. 3 and 4 respectively and the composite temperature profile is shown in FIG. 5. As indicated, the maximum reforming temperature is held below 800 degrees C. because higher temperatures are not essential at intended low operating pressures. Any methane slip will constitute an "inert" at the fuel cell anode and ultimately will usefully be burned in the combustors.

In the relatively low temperature pre-reforming stages higher hydrocarbons are converted and the hydrogen content is increased well below methane cracking temperatures. Above 650 degrees C. carbon formation from methane cracking occurs more quickly than the carbon removal reactions if the methane cracking equilibrium is unfavorable, so high hydrogen levels are required by the time this temperature is reached. The six stages of pre-reforming and reforming that are shown to occur below 650 degrees C. help to ensure that that carbon activity remains below unity at temperatures above 650 degrees.

Also, the fuel processor as shown in FIG. 2 integrates features that facilitate passive control (i.e., self regulation) of operation.

The heat exchangers may be sized and configured such that the temperature profile shown in FIG. 5 is substantially maintained even under conditions of substantial turn-down. Only the maximum reformer temperature requires independent control, by controlling the fuel supply rate.

Counter-flow and co-flow heat exchangers are employed. Both pinch up as flow rates fall, without substantially affecting boundary temperatures.

The split, parallel feed of fuel to the catalytic combustors, the air supply to the two stages of selective CO oxidation and the water supply to the heat exchangers are all integrated into the fuel processor.

Water may be supplied at the rate required to maintain the liquid level in the phase separator, from which provision may be made for a net outflow of steam and a small liquid blow-down. The steam ratio remains reasonably constant with capacity as the availability of heat to raise steam varies with the methane throughput.

Reference is now made to FIGS. 2 to 7 and to the functionality of the various portions 12 to 18 of the fuel processor.

Figure 6:
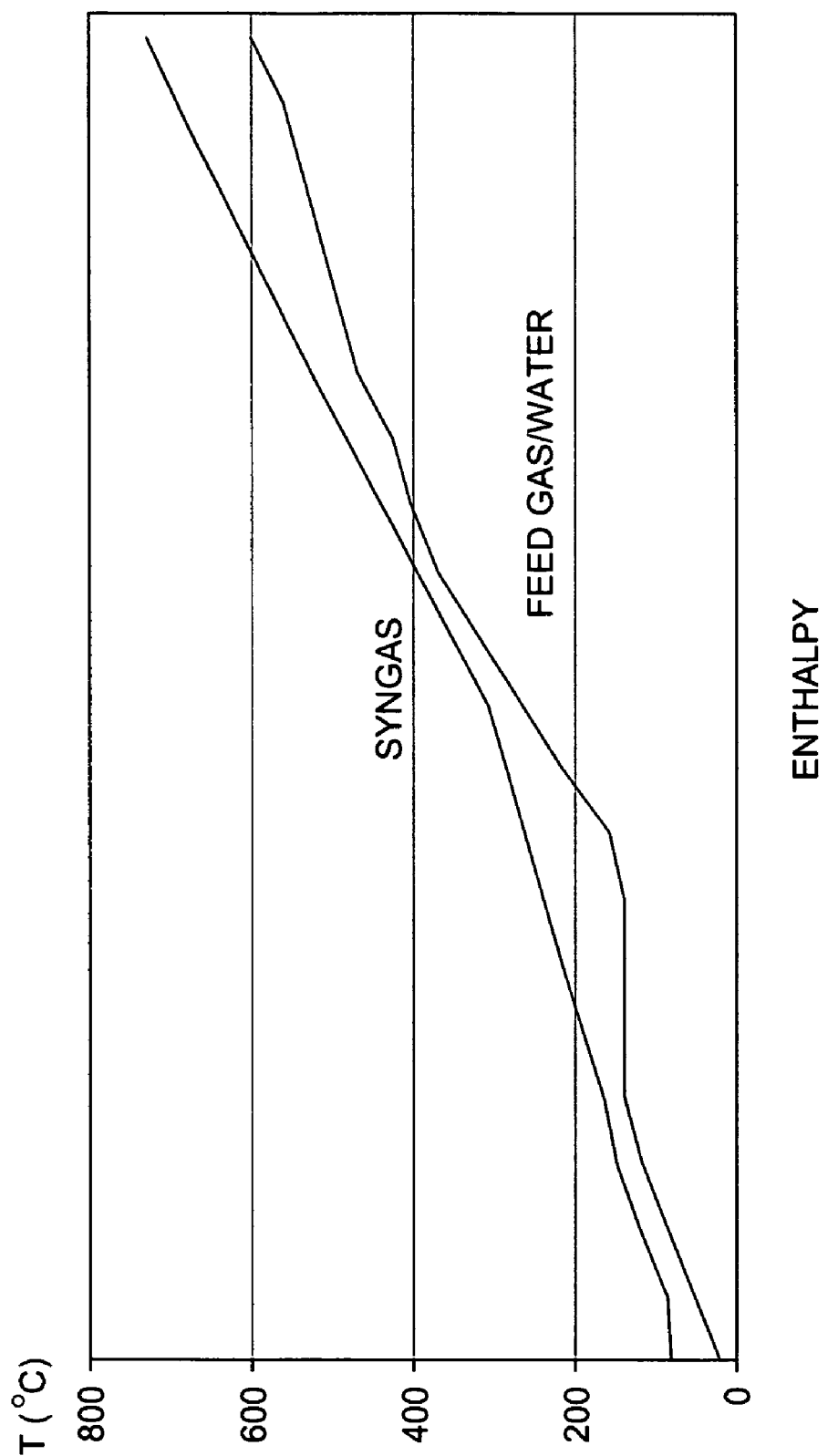
FIG. 6 shows a graph of syngas heat recovery.

In portion 12 a three-stream, counter-flow heat exchanger 22 is employed to preheat the water and methane in the final cooling stage of the syngas, and an internal pinch occurs at the point where water condensation begins on the syngas side. The three-stream heat exchanger permits relatively high effectiveness to be achieved, as shown in FIG. 6, and avoids the need for a controlled split of the syngas stream to preheat the methane and water streams in separate exchangers.

In relation to portion 13, as shown in FIG. 2, it is observed that CO levels should typically be held below 10 ppm for a PEMFC. This requires a selective oxidation (COOX) reaction following the water gas shift. Both of the reactions, as shown, occur in two stages in portion 13.

The heat load for steam raising is relatively high, being about two-thirds of that required from combustion in the reformer stage. Much of the heat recovery from the hot process streams is therefore committed to water boiling, and both the exothermic WGS and COOX reactions can run above the water boiling point, contributing to the steam raising. As indicated water is boiled in a thermosyphon loop in the heat exchangers following these reactions and this provides an opportunity for blow-down, minimizing the quality requirements for make-up water, and avoids dryout on the heat exchange surfaces with high vapor quality.

In portion 15, above the water boiling point, the heat from the hot syngas is used to pre-heat the feed stream. Sufficient heat can be made available to drive the three illustrated stages of preheat, which is favorable for the reasons that:

C2+ molecules in the feed are converted to methane at low temperatures, without risk of coking, Hydrogen levels are increased at low temperature, without risk of methane cracking and, as indicated, the high grade heat is used for the purpose of pre-reforming in the three pre-reformer stages 19.

Two heat exchangers 24 provide counter-flow exchange and the third heat exchanger 25 provides co-flow exchange, in order to lock-in a required temperature profile during turn-down. The co-flow in the third exchanger is provided to counter the possible danger of overheating the feed stream and cracking methane.

In portion 15 a three-stream heat exchanger 26 is again employed, with the fuel and air being preheated separately to avoid the need for a controlled split of the flue gas. The preheated air is passed serially through the illustrated nine stages of catalytic combustion in portion 18, whilst the preheated fuel is fed to combustion zones 27 in parallel streams in order to limit the temperature rise in each zone.

Most of the steam for the processor is raised in the heat exchanger 23 in portion 16, the heat exchanger operating as a once-through boiler which provides an exit quality below about 70% which avoids the possibility of dry-out.

The two further stages 20 of pre-reforming are provided in portion 17 for the purpose of generating relatively low temperature hydrogen, further protecting against methane cracking in the reformer stages 21 in portion 18. One associated heat exchanger 28 is arranged to provide counter-flow exchange and the other heat exchanger 29 provides for co-flow exchange, in order to lock-in a required temperature profile during turndown, without risk of overheating the feed.

Figure 7:
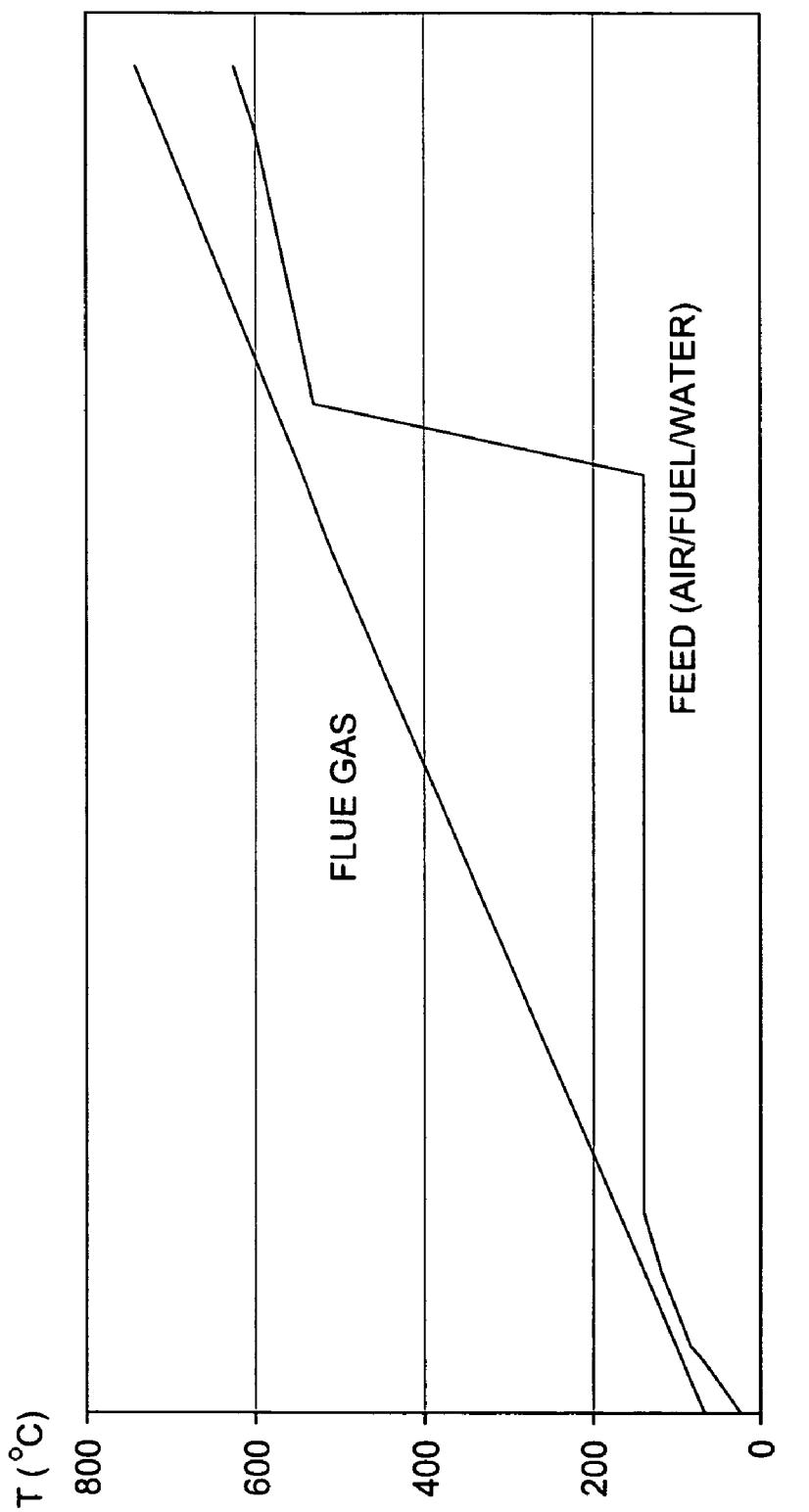
FIG. 7 shows a graph of flue heat recovery.

FIGS. 6 and 7 of the drawings are relevant to the preceding description of the processor portions 13 to 17 in that they show graphically the temperature profiles of the syngas and flue gas heat recovery respectively.

The reformer itself, in portion 18 of the fuel processor consists of the nine stages 21 of reforming reaction which are driven by the nine stages 27 of anode off-gas combustion. The reactions on both sides occur in essentially adiabatic beds, with heat exchangers 30 providing heat exchange between the fluids as they pass between the respective adiabatic beds.

Fluid circuitry within the reformer portion provides for splitting of the anode off-gas into nine parallel streams, as indicated in FIG. 2, and, as will be apparent from plate configurations to be referred to below, further sub-division of the fuel in those streams into numerous parallel streams for intimate mixing into the combustion supporting air prior to combustion at each stage 27.

The ascending temperature profile for the reformer, as shown in FIG. 5, is driven by this circuitry without further active control. As indicated previously, only the maximum reformer temperature requires continuous control through the total fuel supply rate.

Figure 8:
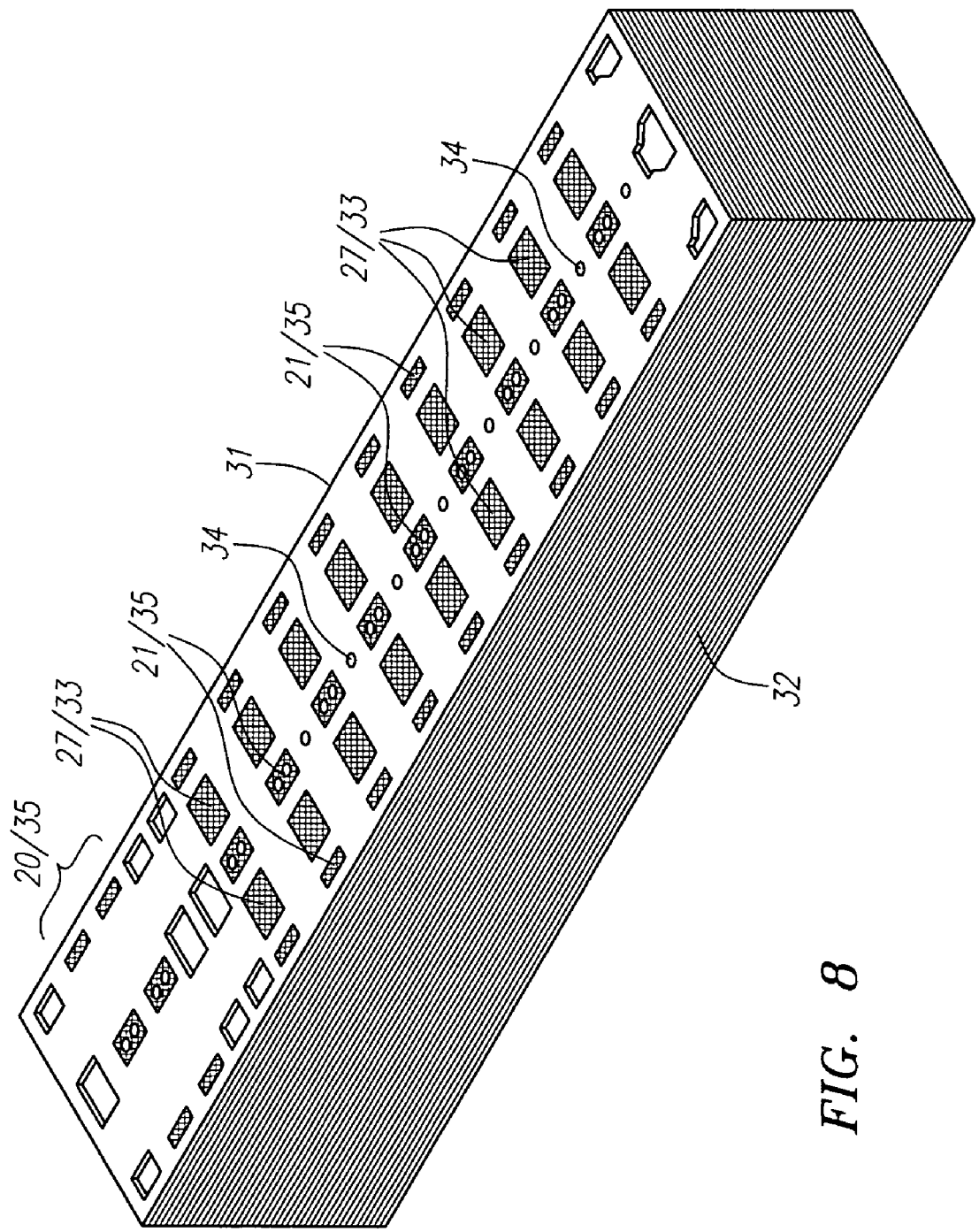
FIG. 8 shows a perspective view of the core of the fuel processor in isolation from associated fluid supply and discharge pipework.

Portions 17 and 18 of the fuel processor as shown diagrammatically in FIG. 2 may be embodied in the core 31 which is shown, also somewhat diagrammatically, in FIG. 8. Associated fluid supply and discharge pipework (as indicated schematically in FIG. 1) are omitted from FIG. 8 and primary features only of the core are illustrated. The features that are omitted, for descriptive convenience, will be understood and readily ascertainable by persons who are familiar with contextual technology.

The core 31 comprises a single stack of diffusion bonded plates 32, the total number of which will be dependent upon the capacity required of the fuel processor in any given application, and the core incorporates two parallel rows of nine reaction zones 33 which, in the case of the above described fuel processor, comprise the combustion zones 27.

The reaction zones 27/33 are fed with a first reactant (i.e., the combustion supporting gas in the case of the fuel processor) by way of end ports (not shown) in the core. Also, the reaction zones 27/33 are fed with a second reactant (i.e., fuel in the case of the fuel processor) by way of inlet ports 34.

The core 31 further incorporates three parallel rows of nine catalyst receiving zones 35 and 35A which, in the case of the fuel processor, comprise the above mentioned pre-reforming and reforming regions 20 and 21 of portions 17 and 18 of the fuel processor. The catalyst receiving zones are fed with a third reactant (i.e., the methane and steam in the case of the fuel processor) by way of inlet and outlet ports in the top and/or bottom of the core as viewed in FIG. 8.

Figure 9:
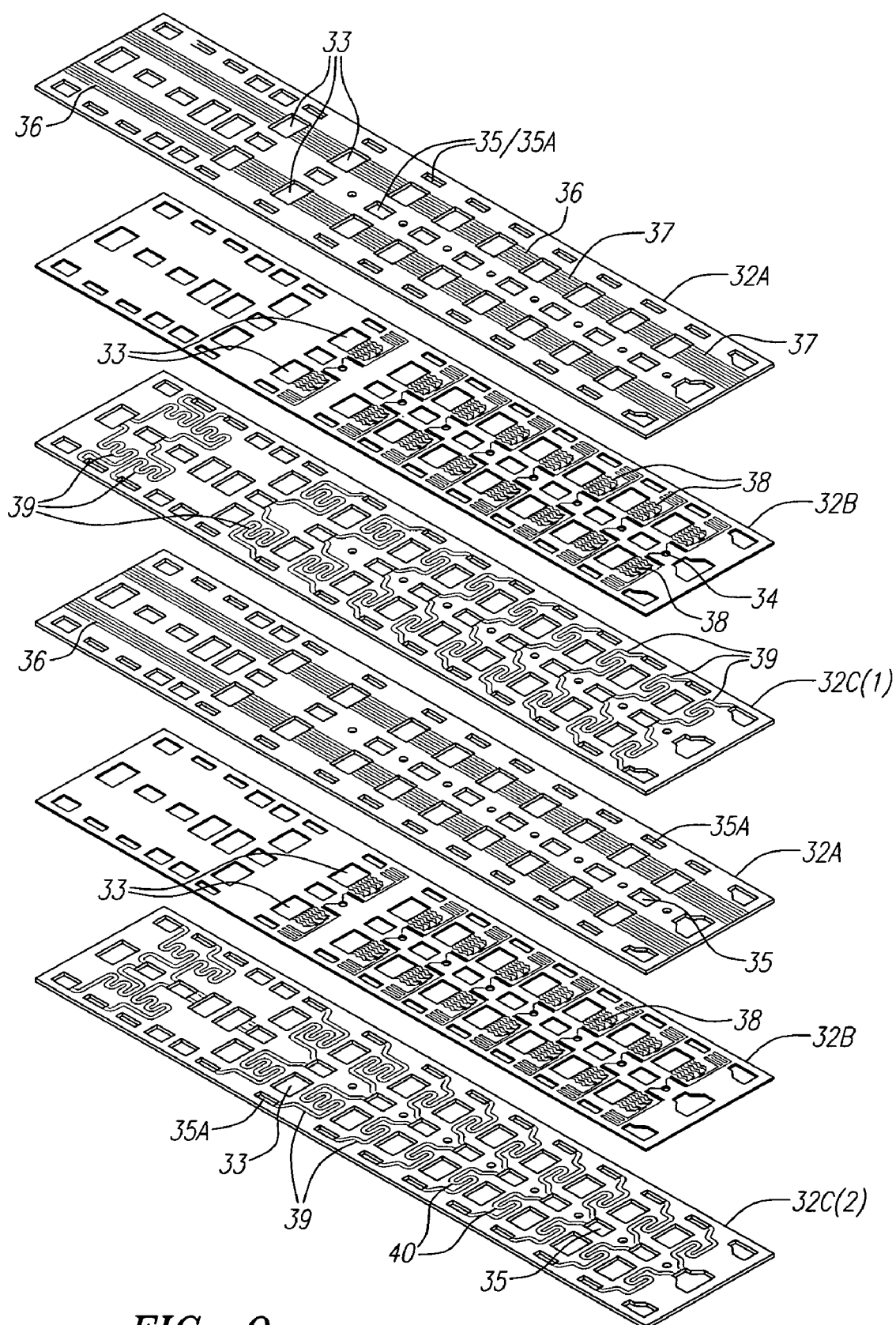
FIG. 9 shows, in superpositioned relationship, a group of six metal plates that are stacked and diffusion bonded with further such groups to form the core.

The plates 32 are all formed with generally rectangular apertures, various ones of which align to form the reaction zones 33 and the catalyst receiving zones 35. The plates are stacked in repeating groups of six plates, one of which groups is shown in FIG. 9 and comprises, from the top down:

Plate 32A—which carries the first reactant (i.e., the combustion supporting gas).

Plate 32B—which carries the second reactant (i.e., the fuel).

Plate 32C(1)—which carries a first stream of the third reactant (i.e., syngas 1).

Plate 32A—which carries the first reactant (i.e., the combustion supporting gas).

Plate 32B—which carries the second reactant (i.e., the fuel).

Plate 32C(2)—which carries a second stream of the third reactant (i.e., syngas 2).

All of the plates are formed from a heat resisting alloy such as stainless steel and all plates typically have the dimensions 600 mm by 100 mm. The plates 32A, C(1) and C(2) have a thickness of up to about 4.0 mm and the plates 32B have a thickness of up to about 2 mm. The thicknesses are examples only and are not intended to limit the invention.

A first channel arrangement 36 is provided in the plates 32A for transporting the first reactant to and between the apertures 33 that define the reaction zones 27. The channel arrangement extends linearly between supply and discharge ports that, in use of the processor, are located at the ends of the core 31. Portions 37 of the channel arrangement that extend between and, in some cases beyond, adjacent pairs of the apertures 33 function, in use, as heat exchange channels.

A second channel arrangement 38 is provided in the plates 32B for delivering the second reactant in parallel streams to each of the reaction zones 33 from the supply ports 34. The second channel arrangement incorporates a large number of feed branches that communicate with the reaction zones 33 to facilitate intimate mixing of the first and second reactants (i.e., the air and combustible gas in the case of a fuel processor) in the reaction zones 33.

A third channel arrangement 39 is provided in each of the plates 32C(1) and 32C(2) for transporting the third reactant in parallel streams to and between the catalyst receiving zones 35 and 35A in the respective plates. Serpentine shaped portions 40 of the third channel arrangement are positioned to locate in heat exchange proximity to the heat exchange portions 37 of the first channel arrangement 36 in the plates 32A with which the plates 32C(1) and C(2) have surface contact.

The various channels in the plates 32A, 32B and 32C(1) and C(2) are approximately semi-circular in cross-section and have a radial depth of up to about 3.0 mm. These depths are examples only and are not intended to limit the invention.

As previously described, the plates 32 are stacked and diffusion bonded in face-to-face relationship; that is, with the (front) channeled face of each plate in contact with the (rear) un-channeled face of its adjacent plate.

Reference is now made to FIGS. 10-28 to describe additional aspects of the invention relating to an overall reforming system and method, as well as to the reformer unit and other system components.

Another aspect of the invention relates to a reforming system and process that are generally more efficient and suitable for smaller-scale production than are tubular reformers. The current invention is suitable for the small-scale production of syngas at pressures of 10 to 15 bar, and more particularly to steam reforming of natural gas, which is widely distributed in pipeline networks and is also often available in large quantities in remote locations. Syngas produced from natural gas may then be used in the production of gases such as hydrogen or ammonia, or used for the production of liquids such as methanol.

However, the technology described herein may also be used for larger scale production. To this end, the reformer apparatus and process are scalable as described herein.

Figure 10:
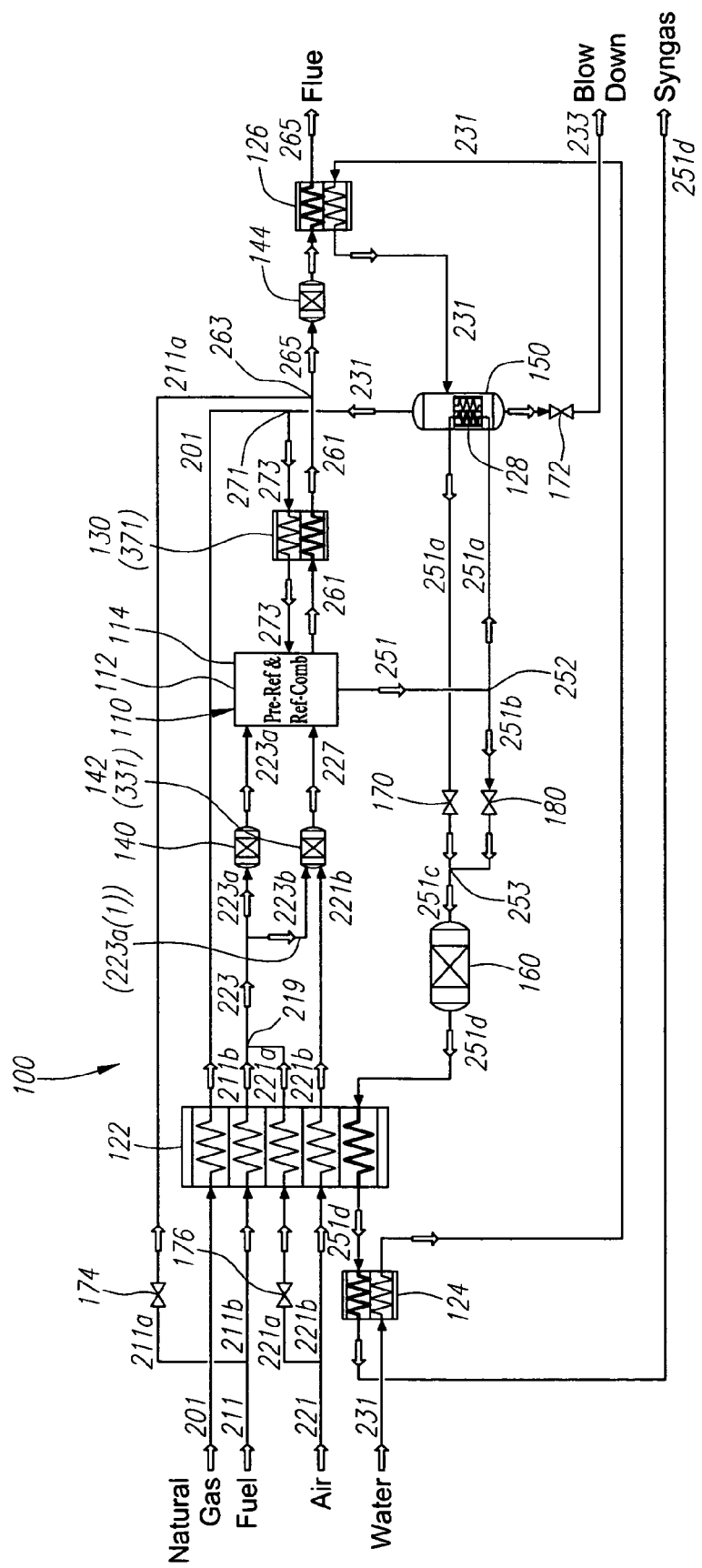
FIG. 10 shows a schematic of an overall reforming system and process

An embodiment of the invention is the reformer system 100 shown in FIG. 10. A primary component of reformer system 100 is reformer device 110 which preferably comprises multiple adiabatic bed combustion and reforming chambers employing inter-bed heat exchangers. As discussed in more detail later, reformer 110 preferably includes reformer unit 112 and pre-reformer unit 114.

Reformer system 100 may also include heat exchangers 122, 124, 126, 128 and 130, which are preferably of the printed circuit heat exchanger type. Reformer system 100 may also include pre-combustion chamber 140 and combustion chambers 142 and 144, vessel or steam water separator 150, water gas shift or high temperature shift reactor 160, valves 170, 172, 174 and 176, and fixed resistor 180. Reformer system 110 also includes various lines to transport fluids, and the direction of fluid flow is shown by the arrows in FIG. 10.

It should be noted that additional and/or different components may be used and the components set forth in FIG. 10 only represent a particular embodiment of the invention. Furthermore, devices typically associated with reforming systems to extract desired end products may be coupled to reformer 100. For example, a pressure swing absorption (PSA) device (not shown) may be coupled to the syngas line exiting reformer 100.

A. Reformer System

The general operation of reformer 100 is now described. The processes occurring in the lines feeding reformer 110 are first described. The processes occurring in the lines exiting reformer 110 are then described.

As shown in FIG. 10, natural gas, fuel, air and water may enter system 100 through lines 201, 211, 221 and 231, respectively. In this embodiment, the fuel in line 211 may be syngas (such as from PSA tail-gas). In order to enhance the efficiency of the reformer system, the natural gas, fuel and air are preferably preheated in heat exchanger 122. For the reader's convenience, the relative hot line through a heat exchanger is shown as a thicker line. For example, the bottom line in heat exchanger 122 is shown thicker since this line represents the syngas line providing heat.

Air line 221 may be split into air lines 221a and 221b prior to heat exchanger 122 in order to provide the required fuel to air ratio to pre-combustor 140. The flow of air in line 221a may be controlled by valve 176. Fuel line 211 may be split into lines 211a and 211b prior to heat exchanger 122. The flow in line 211a may be controlled by valve 174 prior to mixing with the flue gas line 261 at point 263, as discussed later. The hot stream in heat exchanger 122 is the syngas (product stream) in line 251d which originates as line 251 exiting reformer 110.

After heat exchanger 122, preheated fuel line 211b may join with preheated air line 221a at point 219 to form preheated fuel rich fuel/air line 223. Line 223 may then split into line 223a and line 223b. The preheated fuel/air mixture in line 223a may then be further heated through combustion in pre-combustion chamber 140. Line 223a may then enter reformer device 110, and more particularly to reformer 112 therein as discussed later.

The preheated fuel/air mixture in line 223b and the preheated air in line 221b may then be mixed and combusted in combustion chamber 142 enabling heat to be added to the first stage of the reforming process (as discussed later in connection with heat exchanger 321 of reformer 112 in FIG. 16). The resulting air-rich mixture in line 227 may then enter reforming device 110, and more particularly reformer 112 therein as discussed later.

It is preferred that coking, from methane cracking, and metal dusting are avoided in the feed streams to reformer 110 and in reformer 110 itself. An appropriate degree of partial oxidation in the pre-combustor 140 and an appropriate flow of fuel to combustor 142 preferably maintain compositions and temperatures which do not promote methane cracking or metal dusting in either the reforming or fuel streams respectively.

The water in line 231 is preferably preheated in heat exchanger 124 by the syngas in line 251d. The water may then be further heated in heat exchanger 126 by flue gas in line 265, and preferably some steam is raised in the water in heat exchanger 126.

The temperature of flue gas in line 265 may be increased prior to heat exchanger 126 by the combustion of the fuel in line 211a in combustion chamber 144. Combustion heat may thereby be supplied to water in line 231, increasing the amount of steam raised in heat exchanger 126.

Figure 12:
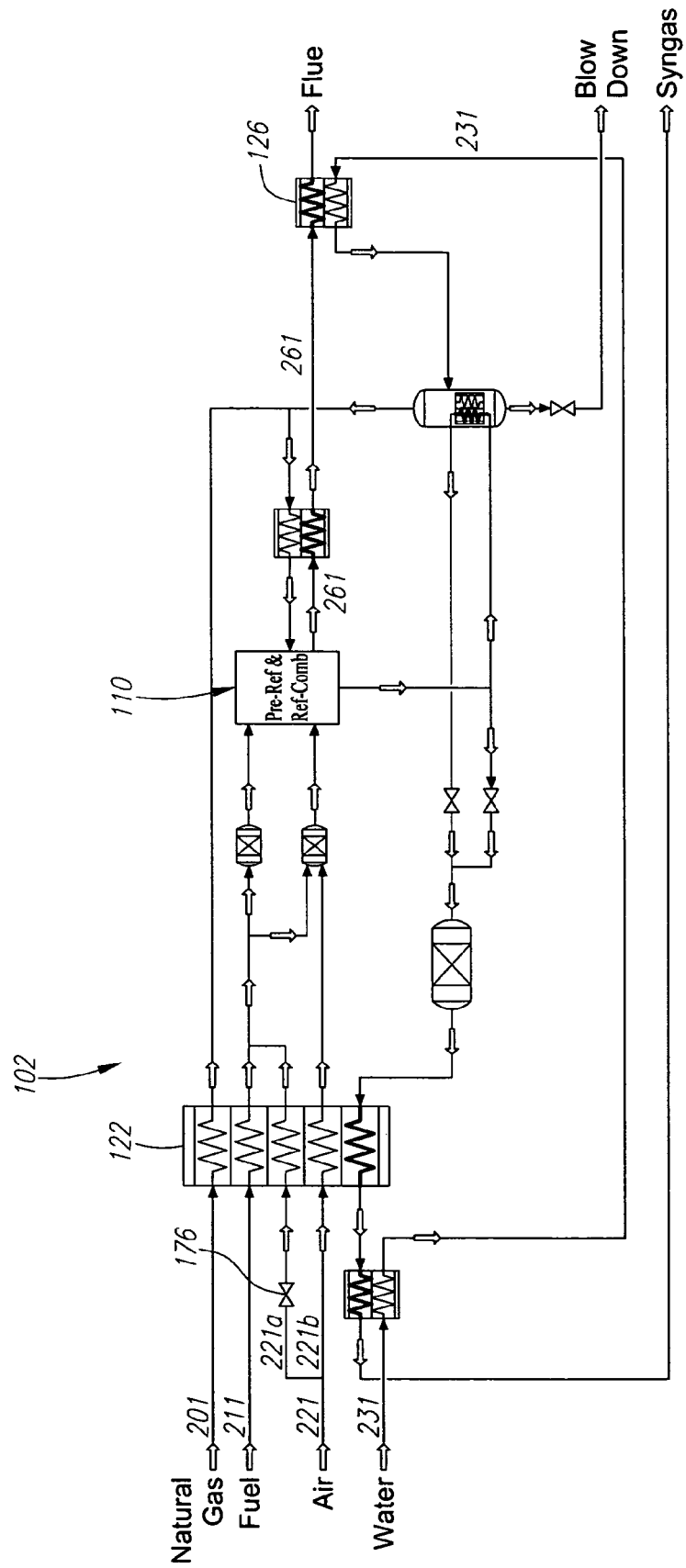
FIG. 12 shows a schematic of an alternate overall reforming system and process suited for use with higher temperature syngas.

In the embodiment of FIG. 12 discussed later, combustion chamber 144 is not included. The inclusion of combustion chamber 144 in reformer 100 of FIG. 10 permits a steam-to-carbon ratio of greater than 4.0 to be achieved, compared to the embodiment of FIG. 12 where the achievable steam ratio may be on the order of 3 to 3.5.

The use of the additional combustion chamber 144 may be suited to lower temperature operation of the reformer, e.g., at less than 830° C. syngas equilibrium temperature, because the higher available steam ratio may compensate for the loss in methane conversion that typically accompanies a lower temperature operation. In addition, the additional combustion chamber 144 may be beneficial in accelerating startup.

The water in line 231 may then pass to vessel 150, which may serve as a steam/water separator. Heat exchanger 128 may be at least partially submerged under the water level in vessel 150, enabling water to pass through substantially vertical passages in the heat exchanger, boiling as it does so. The water level in vessel 150 may be controlled by means routinely employed in controlling water level in attended or unattended steam boilers, as appropriate. Circulation of water through heat exchanger 128 may be sustained by a thermo-syphon effect—that is, by the density differences between boiling and single-phase water. The hot stream in heat exchanger 128 is syngas in line 251a, which originates as line 251 exiting reformer 110. The heat available from the hot syngas in line 251 raises most of the steam necessary for the reforming process in reformer 110. The balance is raised in heat exchanger 126.

Steam may exit vessel 150 along line 231 as shown. A blow down line 233 may also exit vessel 150 and extend through valve 172. The blow down line 233 may be used to periodically discharge a quantity of water from vessel 150 in order avoid a build-up of dissolved solids.

The steam in line 231 is then mixed with the natural gas in line 201 at point 271, and this mixture (line 273) enters heat exchanger 130 where it is heated by the hot flue gas in line 261 emerging from reformer 110. The mixture of natural gas and steam then enters reformer 110, and more particularly pre-reformer 114 as discussed later.

The processes occurring in the lines exiting reformer 110 are now further described. As shown in FIG. 10, syngas and flue gas exit reformer 110 in lines 251 and 261, respectively.

Syngas line 251 may split into lines 251a and 251b at splitter 252. As mentioned above, syngas line 251a may extend to the heat exchanger 128 submerged in vessel 150 to provide heat for raising steam. The temperature of the syngas is substantially decreased by quench exchanger 128. Syngas line 251a may then extend through valve 170 to point 253.

Syngas line 251b may extend from splitter 252 through fixed resistor 180. Fixed resistor 180 is preferably used at this point because the syngas in line 251b is too hot to employ a valve. Line 251b may then join with line 251a at point 253. The remixed syngas from lines 251a and 152b then continues through line 251c.

Valve 170 may be used to control the relative proportions of hot and cooler syngas provided by lines 251b and 251a, respectively. In this manner, the temperature of the remixed syngas in line 251c may be adjusted so that it is appropriate to enter the high temperature shift reactor 160 where additional hydrogen may be generated by the water gas shift reaction.

It is preferred that both heat exchanger 128 and fixed resistor 180 are configured to maintain turbulent flow through the desired range of turndown in which system 100 may operate. For example, the flow path in heat exchanger 128 may be tortuous, and fixed resistor 180 may be a simple orifice. The pressure drop through heat exchanger 128, and the pressure drop through fixed resistor 180, may thereby be constrained to varying substantially with the square of the flow rate. (This is in contrast to the situation where one of heat exchanger 128 and fixed resistor 180 operates with laminar flow in which the pressure drop varies directly with flow.) Inducing turbulent flow in both heat exchanger 128 and fixed resistor 180 preferably maintains the appropriate proportions of syngas from lines 251a and 251b through the desired range of turndown.

Valve 170 may be optionally provided for flow balancing at plant commissioning, and preferably does not need further adjustment.

After reactor 160, syngas in line 251d travels through heat exchangers 122 and 124 as discussed above. As discussed later in connection with FIG. 13, heat exchangers 122 and 124 may comprise a single physical device. The use of multi-stream exchangers, such as heat exchangers 122 and 124, preferably avoids the need to control the split of syngas between several parallel duties.

Flue gas may exit reformer 110 through line 261. As discussed above, the flue gas may be used in heat exchanger 130 to heat the mixture of natural gas and steam. At point 263, fuel line 211a may join with flue gas line 261. The resulting mixture may then be combusted in chamber 144 and the resulting gas may be used to heat water in heat exchanger 126.

B. Alternate Reformer System

Figure 11:
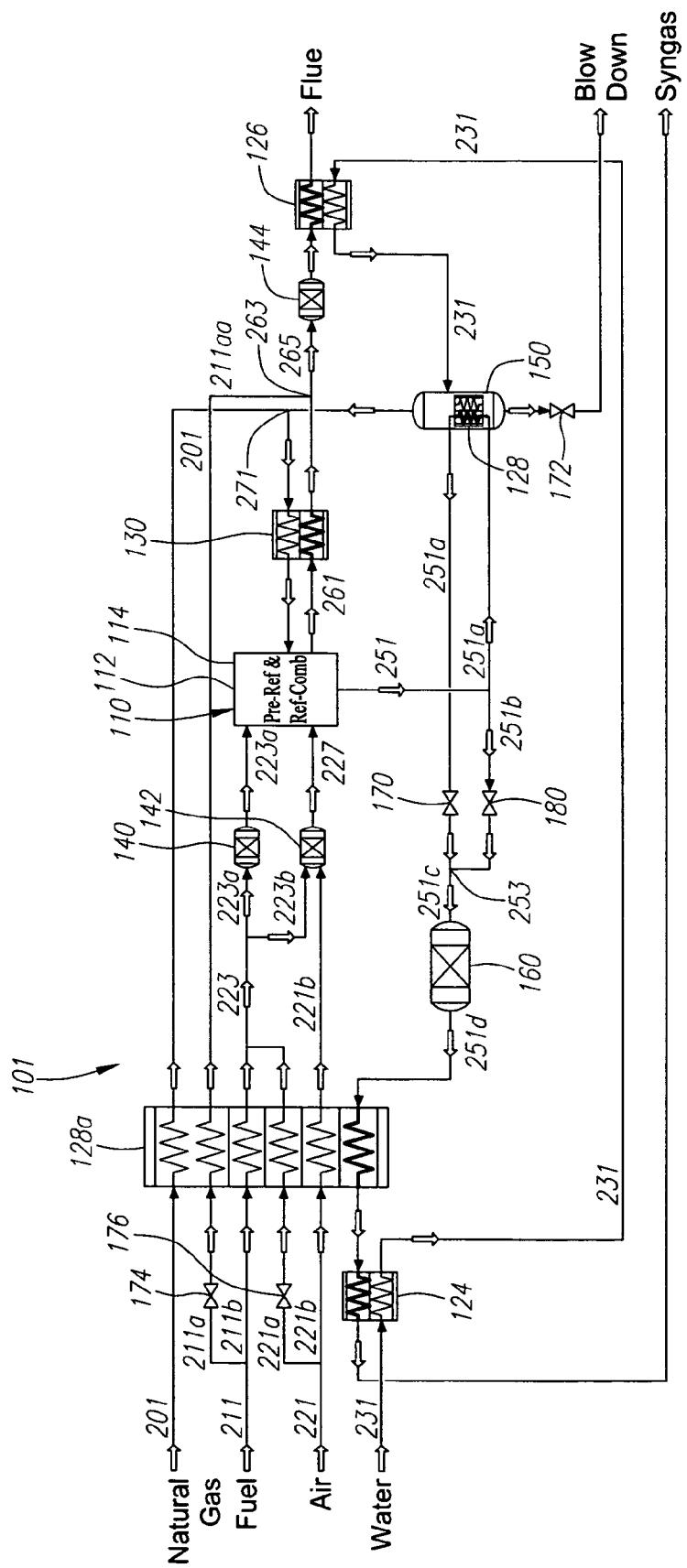
FIG. 11 shows a schematic of an alternate overall reforming system and process.

An alternate reformer embodiment 101 is now described with reference to FIG. 11, with components similar to those in FIG. 10 bearing the same reference numerals. Reformer 101 differs from reformer 100 in that it uses a six-stream heat exchanger 128a instead of the five-stream heat exchanger 128 in FIG. 10.

Another difference is that fuel line 211 in reformer 101 may split into two lines 211aa and 211b that are both preheated in heat exchanger 128a (as opposed to only line 211b being preheated in heat exchanger 128 of reformer 100). However, fuel line 211aa may eventually join with the flue gas exiting reformer 110 in line 261, at point 263. These variations preferably increase efficiency as more waste heat, from the syngas effluent, may be recovered by the cold feed streams.

C. Alternate Reformer System

An alternate reformer embodiment 102 is now described with reference to FIG. 12. As mentioned previously, reformer 102 does not include combustion chamber 144 prior to heat exchanger 126 as does reformer 100 of FIG. 10. Thus the additional heat that could be imparted to the water in heat exchanger 126 owing to the combustion is not available.

The reformer embodiment 102 is preferably suited to operate with higher maximum syngas temperatures, e.g., approaching 900° C. At this higher temperature, the additional steam raised with the assistance of combustion chamber 144 in FIG. 10 is not required as reforming at a higher temperature provides higher methane conversion, for a given steam-to-carbon ratio.

D. Fuel Efficiency

An aspect of the current invention relating to increased fuel efficiency is now further described.

Downstream of reformer 110, heat is available from the effluent streams of the reforming process, which are syngas (product) in line 251 and flue gas in line 261. This aspect of the invention involves the recovery of effluent stream heat by the feed streams, e.g., lines 201, 211, 221 and 231. The amount of fuel necessary to create a given quantity of syngas is thereby reduced.

Figure 25:
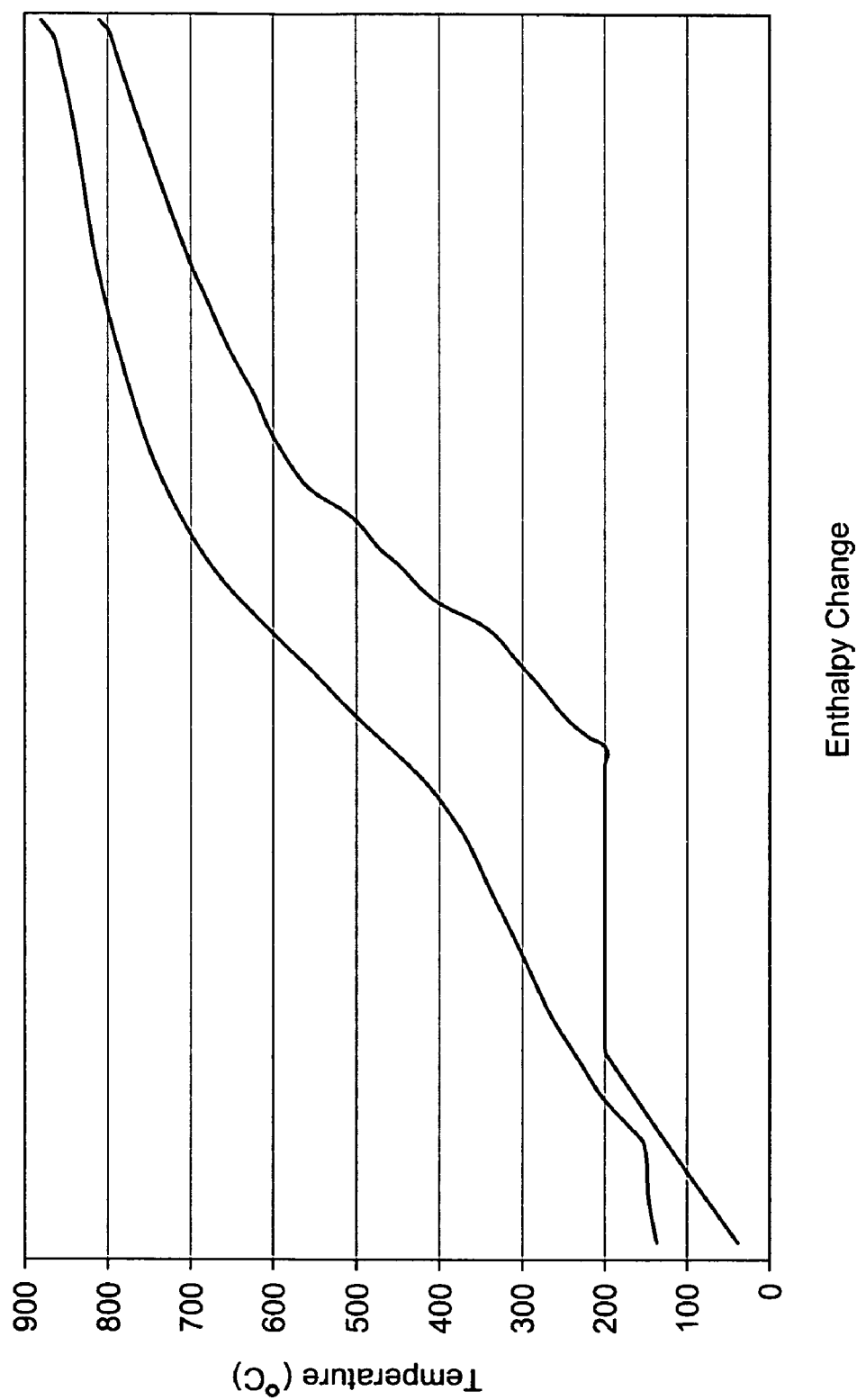
FIG. 25 shows a temperature enthalpy chart.

With the recovery of effluent stream heat, reformer system 100, 101 or 102 preferably operates in an efficient manner. For example, FIG. 25 illustrates a temperature-enthalpy chart for reformer 100, which shows a tight pinch, which is indicative that efficiency approaches thermodynamic limits for the process.

The recovery of heat from syngas (product) to the fluids in heat exchanger 122 is now further described. Syngas line 251 may split into two lines 251a and 251b, and may then rejoin at point 253 to form single syngas line 251c. Line 251c may then transport the syngas to high temperature shift process reactor 160. The syngas may then flow to heat exchanger 122 along line 251d.

The temperature of the syngas in line 251d as it passes through heat exchanger 122 may be about 400° C. This is preferably low enough to avoid coking or methane cracking in the natural gas feed in line 201. As discussed later, the temperature of the syngas prior to entering heat exchanger 122 is also preferably below metal dusting temperatures to avoid damage to heat exchanger 122. Based on this syngas temperature, the heat exchange may raise the temperatures of the natural gas in line 201 and of the fuel in line 202 from ambient (nominally about 20° C.) to about 350° C. These temperatures are examples only and are not intended to limit the invention. Thus, the recovered heat from downstream syngas may be used to preheat these incoming fluids and so reduce the need for fuel for the reforming process.

Figure 13:
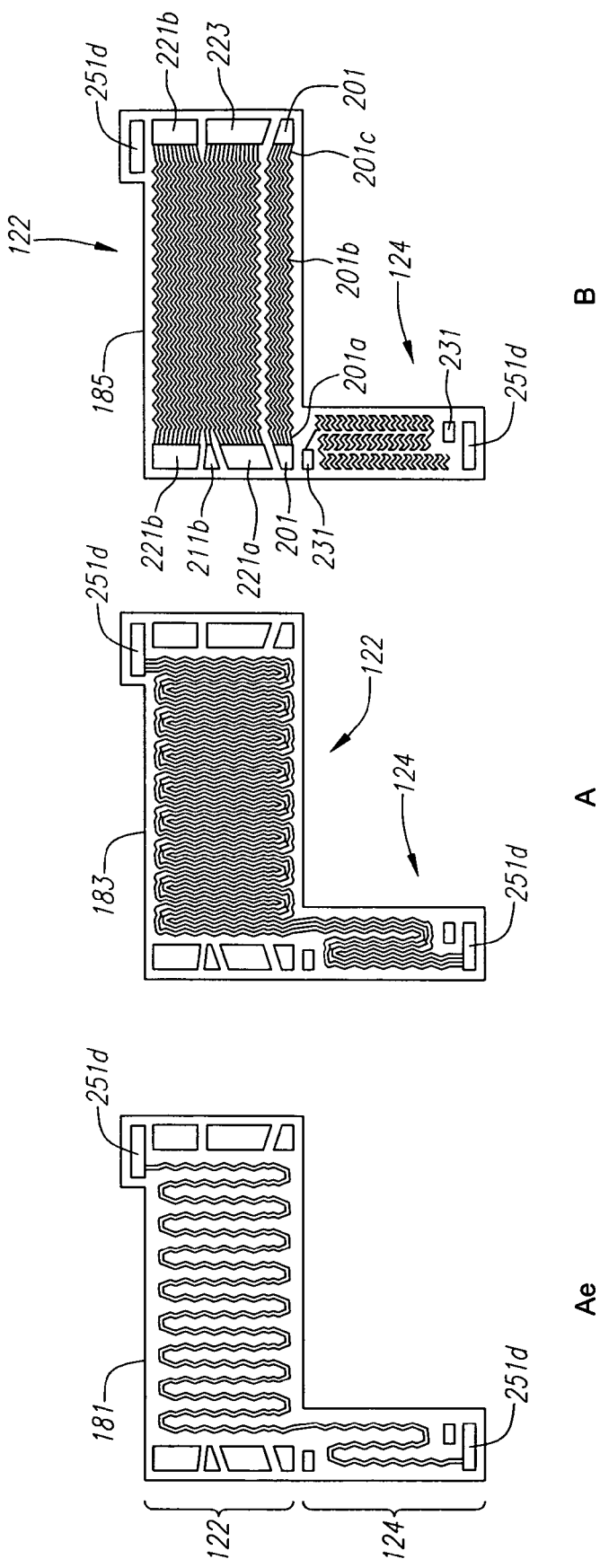
FIG. 13 shows plates for use in a stack of plates comprising a heat exchanger or heat exchangers.

The construction of heat exchanger 122 that is used to preheat lines 201, 211 and 221 is now further described with reference to FIG. 13. Heat exchanger 122 preferably comprises a stack of plates superposed on one another. As discussed earlier, paths may be formed in the plates by etching, milling or other suitable process, and channels may be formed when the plates are superposed on one another. As shown in FIG. 13, the portion indicated by the reference no. 122 may comprise heat exchanger 122, while the portion indicated by the reference numeral 124 may comprise heat exchanger 124 discussed below.

The following types of plates may be used in forming the stack of plates comprising heat exchanger 122: bounding plate (Ae) 181, syngas plate (A) 183, air-fuel-gas-water ("AFGW") plate (B) 185 and appropriate end plates (not shown). The plates may be arranged in the following order using the parenthetical designations noted above: Ae B A B A ... B Ae, wherein the "BA" represents a "cell" or combination of plates that may be repeated within the overall stack. In the overall stack, there are preferably two bounding plates (Ae) 181 per stack, and one syngas plate (A) 183 per cell and one AFGW plate (B) 185 per cell. There is also preferably an AFGW plate (B) 185 to the inside of each bounding plate (Ae) 181.

The BA cell may be repeated to effect the desired heat transfer. The number of times the BA cell is repeated in the stack may also be increased or decreased so that the overall system 100 may be scaled up or down. The system 100 may also be scaled up by using multiple stacks.

As shown in FIG. 13, and using the reference numerals of FIG. 10, the syngas from line 251d may pass through the channels whose ports are marked 251d. The air in line 221b may pass through AFGW plate (B) 185 through channels 221b. Similarly, the fuel in line 211b and air in line 221a may pass through channels 211b and 221a, respectively, and emerge in channel 223. The natural gas in line 201 may pass through channel 201.

The syngas channels in plates 181 and 183 may have a 1.10 mm depth, a 1.95 mm width and a 0.40 mm ridge. The air and fuel channels 221b, 211b, 221a and 223 and portion 201b of natural gas channel 201 may have a 1.00 mm depth, a 1.90 mm width and a 0.40 mm ridge. The end portions 201a and 201c of natural gas channel may have a 1.00 mm depth, a 1.75 mm width and a 0.50 mm ridge. These channel dimensions are examples only and are not intended to limit the invention.

In a preferred embodiment for producing approximately 5 standard cubic meters of hydrogen per hour from a downstream PSA unit, heat exchanger 122 may comprise a bounding plate, fourteen cells, an additional AFGW plate, a bounding plate and five end plates. This provides 31 active plates. The plate thickness may be about 1.65 mm and the stack may have a height of 59.4 mm. The number of plates and dimensions thereof are examples only and are not intended to limit the invention, and as discussed above, the system 100 may be scaled by changing these parameters.

The recovery of heat from the syngas and flue gas by the water in line 231 is now discussed. The following discussion generally follows the path of the water in line 231 through system 100 in FIG. 10. After passing through heat exchanger 122, line 251d may then transport the syngas effluent to heat exchanger 124 where it may heat the water in line 231. In this manner, recovered heat is used to raise the water's temperature prior to creating the steam necessary for the steam reforming reaction in reformer 110.

The construction of heat exchanger 124 is again discussed with reference to FIG. 13. As shown, heat exchanger 124 may comprise a portion of plates 181, 183 and 185. Syngas may flow through channel 251d which may be contiguous to channel 251d in heat exchanger 122. Water may flow through channel 231. Syngas channel 251d may be dimensioned as in heat exchanger 122. Water channel 231 may have a 1.10 mm depth, a 1.90 mm width and a 0.40 mm ridge. The stacking of the plates comprising heat exchanger 124 may be the same as with heat exchanger 122. Similarly, the number of plates used in heat exchanger 124 may vary to scale system 100 as desired.

The water in line 231 may then continue to heat exchanger 126 as shown in FIG. 10. Within heat exchanger 126 additional heat is preferably provided by flue gas and fuel in line 265. As shown in FIG. 10, the flue gas may be heated by the addition of fuel at point 263 and combustion in combustor 144, or, alternatively, as shown in FIG. 12, the flue gas may not be heated by the addition and combustion of further fuel immediately prior to heat exchanger 126.

Sufficient heat may be available in heat exchanger 126 to generate some of the steam necessary for the steam reforming reaction in reformer 110.

Figure 14:
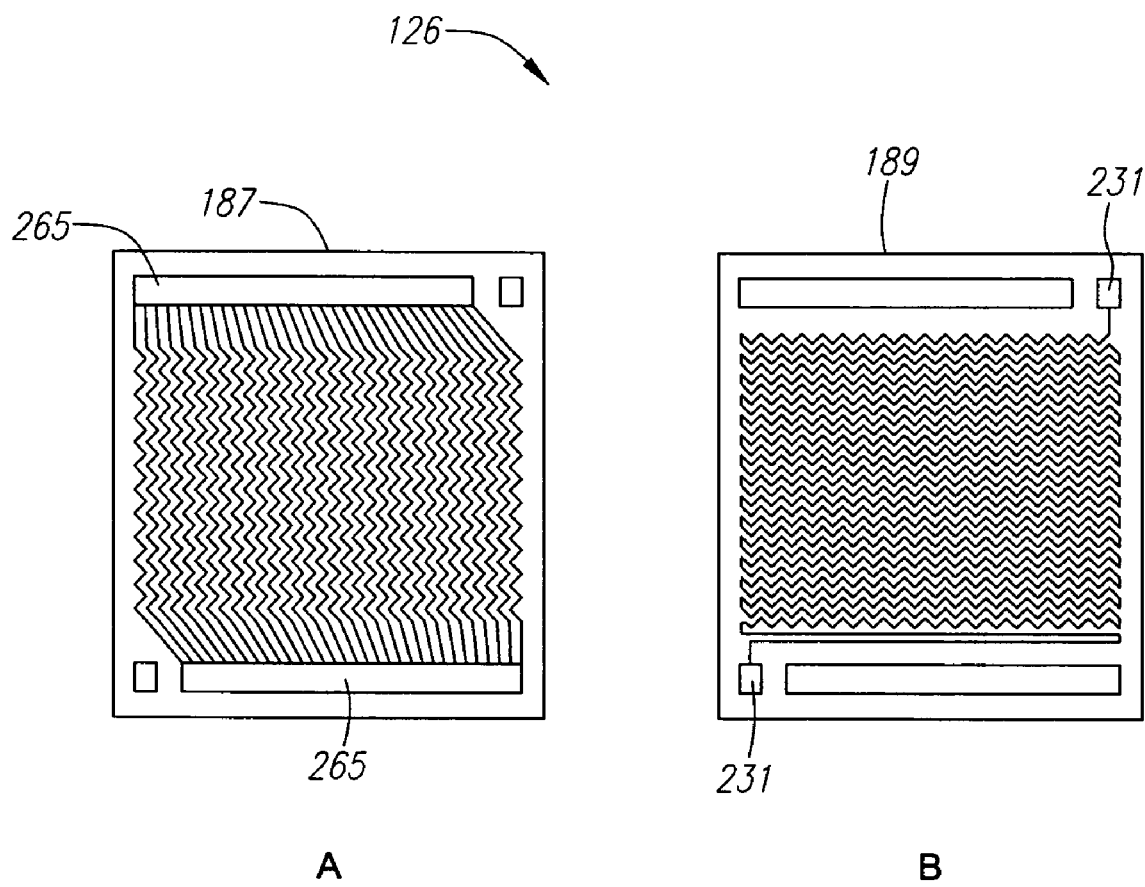
FIG. 14 shows plates for use in a stack of plates comprising a heat exchanger.

The construction of heat exchanger 126 is now further described with reference to FIG. 14. Heat exchanger 126 preferably comprises a stack of plates superposed on one another. The following stack may include the plates: flue plate (A) 187 and water plate (B) 189. The plates may be arranged in the following order: ABAA B A . . . A B A, wherein there are two flue plates (A) 187 per cell and one water plate (B) 189 per cell. As shown, flue gas may flow through channel 265 (or channel 261 in system 102) and water may flow through channel 231. Flue gas channel 265 may have a 1.00 mm depth, a 1.90 mm width and a 0.40 mm ridge. Water channel 231 may have a 0.75 mm depth, a 1.63 mm width and a 0.40 mm ridge. These channel dimensions are examples only and are not intended to limit the invention.

In a preferred embodiment for producing approximately 5 standard cubic metres of hydrogen per hour from a downstream PSA unit, the stack may include ten ABA cells and six endplates thereby providing thirty active plates. The plate thickness and stack height may be the same as with heat exchangers 122 and 124, and may vary to provide scalability. The number or plates and dimensions thereof are examples only and are not intended to limit the invention.

As shown in FIGS. 10 and 12, water/steam in line 231 may then enter vessel 150 where it is further heated by heat recovered from the effluent syngas in line 251*a*.

Heat exchanger 128 is preferably submerged in the water of vessel or tank 150 to permit transfer of heat from the syngas in line 251*a* to the water in vessel 150. The heat imparted to the water in vessel 150 preferably generates most of the steam required for the steam reforming process in reformer 100, 101 or 102.

Figure 15:
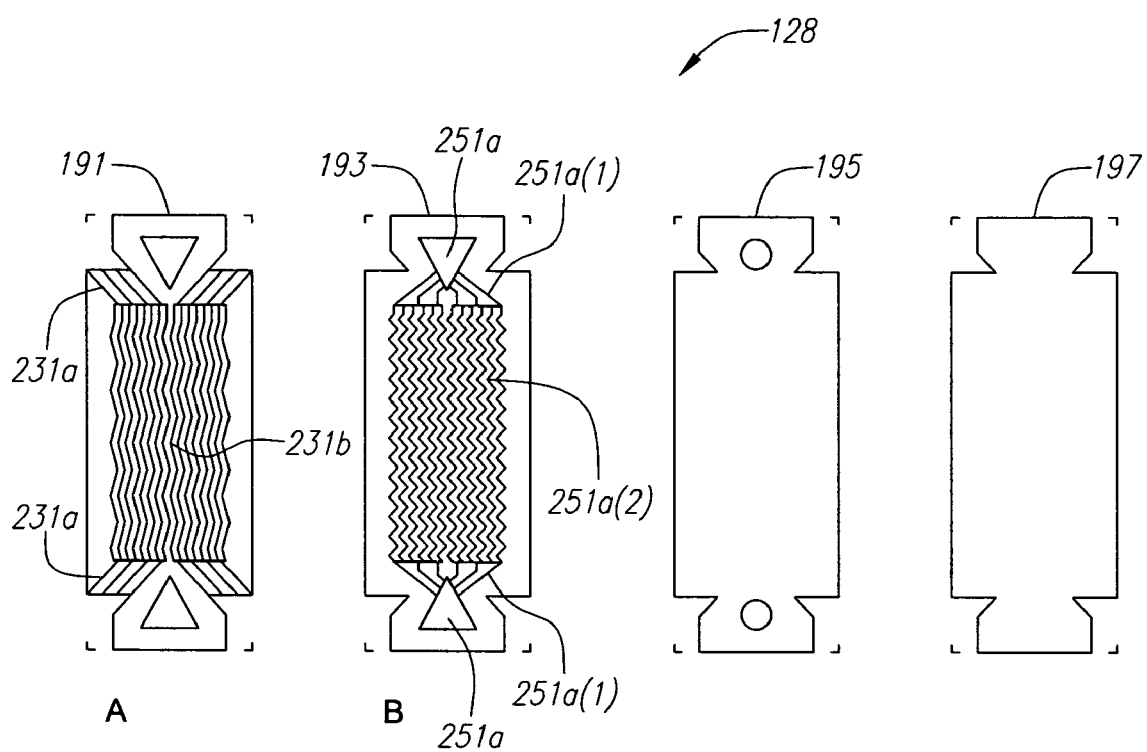
FIG. 15 shows plates for use in a stack of plates comprising a heat exchanger.

The construction of heat exchanger 128 is now further described with reference to FIG. 15. Heat exchanger 128 preferably comprises a stack of plates that are superposed on one another and that maintain turbulent flow of syngas through the range of desired turndown of system 100. These plates may include: water plate (A) 191, syngas plate (B) 193, top end plate 195 and bottom end plate 197. The plates may be arranged in the following order: AB A B A B A B A, wherein there is one water plate (A) per cell, one syngas plate (B) per cell and one bounding plate (Plate A) per stack, which may have the same pattern as water plate (A) 191.

As shown, water may flow through channel 231 (comprising portions 231*a* and 231*b*) and syngas may flow through channel 251*a* (comprising portions 251*a*(1) and 251*a*(2)). Portion 231*a* may have a 1.10 mm depth, a 2.60 mm width and a 0.40 mm ridge. Portion 231*b* and portion 251*a*(2) may have a 1.1 mm depth, a 1.99 mm width and a 0.40 mm ridge. Portions 251*a*(1) may have a 1.10 mm depth, a 2.20 mm width and a 0.40 mm ridge. These channel dimensions are example only and are not intended to limit the invention.

In a preferred embodiment for producing approximately 5 standard cubic meters of hydrogen per hour from a downstream PSA unit there are four AB cells and a bounding plate having the same pattern and four endplates. This provides nine active plates. The plate thickness may be 1.65 mm with a stacked height of 21.45 mm. The number of plates and dimensions thereof are examples only and are not intended to limit the invention. The number of plates may be varied to scale system 100.

As shown in FIG. 10 the steam may then flow through line 231 to heat exchanger 130. Before arriving at heat exchanger 130, steam line 231 may mix with natural gas line 201, at point 271, to form line 273. Line 273 may thus contain the reactants for the steam reforming process in reformer 110. As the mixture of natural gas and steam passes through heat exchanger 130, it is preferably heated by heat recovered from the effluent flue gas traveling in line 261 to approximately 500° C. This is an example temperature and is not intended to limit the invention.

Figure 16:
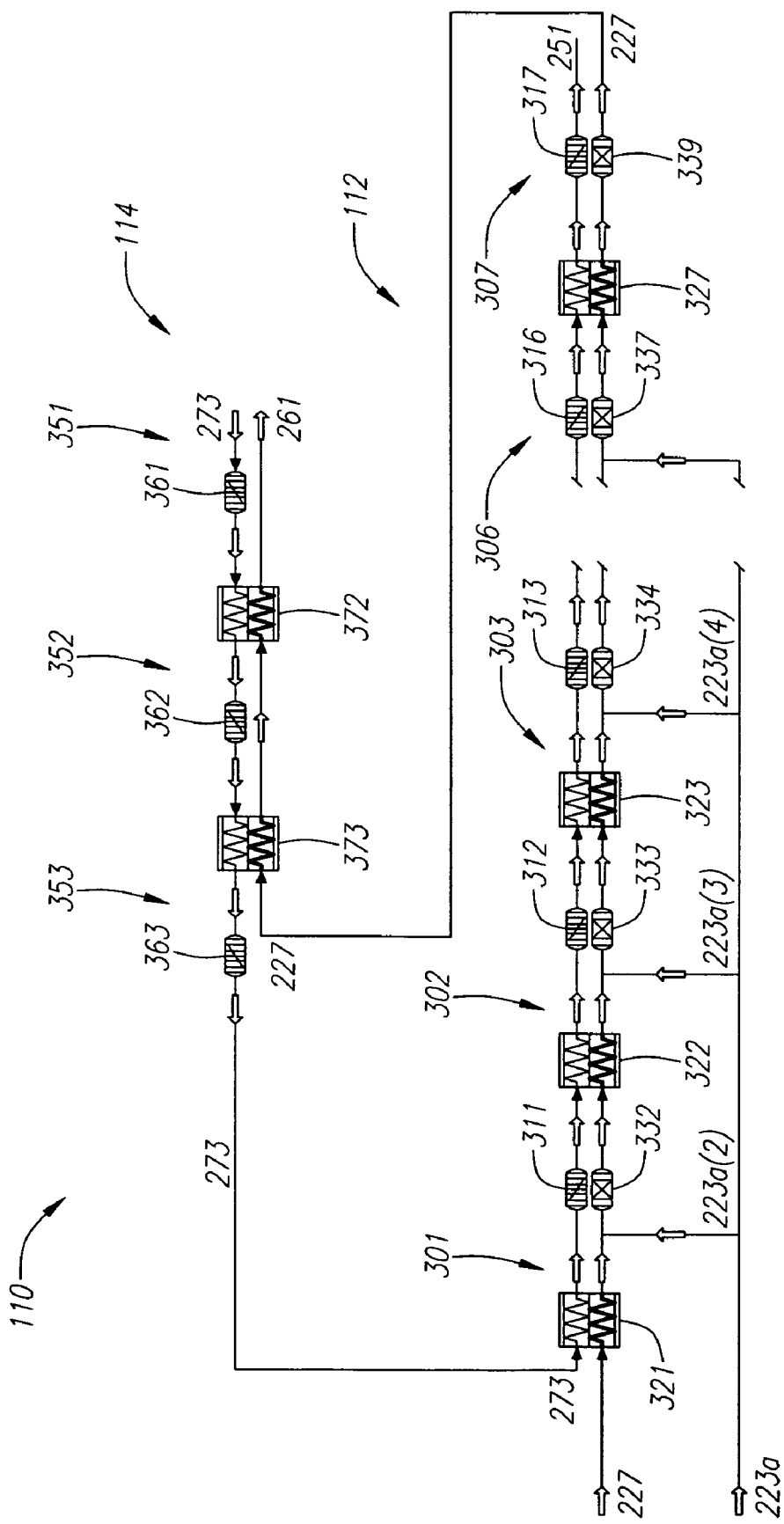
FIG. 16 shows a schematic for a reformer unit including a reformer and pre-reformer.

After heat exchanger 130, the mixture of natural gas and steam in line 273 may enter reformer 110, and more particularly, into pre-reformer chamber 361 of FIG. 16. Thus, heat from the syngas and flue gas effluents of reformer 110 is recovered by the water and steam at several temperature levels.

The recovery of heat from effluent streams by natural gas is now described. As discussed previously, the natural gas in line 201 as shown in FIG. 10 may be pre-heated by the syngas in heat exchanger 122. Thereafter, the natural gas in line 201 may mix at point 271 with the steam in line 231, and thereafter be heated by the heat recovered from the flue gas in heat exchanger 130.

As described above, the heat in the syngas and flue gas effluents from reformer 110 is preferably used at appropriate temperature levels to raise the temperature of the feed streams to the reformer, allowing the smaller-scale reformer of the current invention to obtain efficiencies previously achievable only in large scale reforming operations.

E. Metal Dusting

Another aspect of the invention addresses metal dusting conditions and is now described. Metal dusting is the catastrophic carburization of metal components by gases containing hydrogen and carbon monoxide with carbon activity greater than one. Most commonly it occurs in the temperature range 500°-700° C. In this aspect of the invention, metal dusting conditions are avoided within heat exchangers and other components of system 100 for which protection from metal dusting is difficult and/or expensive.

To address this issue, the current invention preferably localizes potential metal dusting conditions to locations where limited use of non-corrosive metals, or the coating of otherwise-susceptible metals, can be accommodated without excessive cost, or where the replacement of components that have been subjected to metal dusting may be made more easily.

To accomplish this, the hydrogen and carbon monoxide containing gases—syngas and, where residual syngas from a downstream process is used as the fuel, fuel—is preferably either heated above the metal dusting temperature range, or cooled below this range, prior to entering a heat exchanger. In this manner, the combination of gas composition and metal temperature that can give rise to metal dusting is preferably avoided within the heat exchangers themselves.

In reformer 100 of FIG. 10, the fuel entering reformer 100 in line 211 may generally be at room temperature. As shown, the fuel may then be pre-heated in heat exchanger 112 along with the other fluids (natural gas in line 201 and air in line 203). In a preferred embodiment, the fuel may be preheated, but only to a temperature which is below the temperature range likely to give rise to metal dusting. For example, the fuel may be preheated to about 350° C. Metal dusting is thereby preferably avoided in heat exchanger 122.

Following exchanger 122, the fuel may contain unconverted or added methane. If this fuel entered reformer 110, where metal temperatures exceed 600° C., there would be a risk of both metal dusting conditions and methane cracking conditions arising. Accordingly, the fuel in line 223a is preferably combusted in chambers 140. An appropriate degree of partial oxidation occurs during combustion which prevents both metal dusting and methane cracking from arising, by increasing the fuel temperature to the vicinity of the reforming temperature and lowering its methane content.

The combustion in chamber 140 preferably raises the gas temperature above 700° C., which is generally above the metal dusting temperature range. Metal dusting damage to reformer 110 is thereby preferably avoided.

In this aspect of the reforming process, the potential metal dusting condition is preferably limited to combustion chamber 140, where resistant materials or protective coatings may be employed cost-effectively. To the extent metal dusting occurs therein, they are less expensive and more easily replaced.

The quenching of syngas to avoid metal dusting conditions is now described. In systems 100, 101 and 102, of FIGS. 10, 11 and 12, respectively, the syngas exiting reformer 110 is generally of the order of 800-900° C. It is preferred not to use a gas-to-gas feed-effluent exchanger to recover heat from the hot syngas as there will inevitably be points within such an exchanger where metal dusting conditions will prevail.

To avoid this possibility, the syngas is preferably quenched utilizing heat exchanger 128 submerged in the water contained in vessel 150.

The high boiling heat transfer coefficients of the water result in all metal in the exchanger 128 being held near the water boiling point (about 200° C.). The vessel 150 is itself also held near the boiling point. Thus, heat exchanger 128 and vessel 150 preferably avoid metal dusting.

It should be noted that a length of pipe adjacent to the exterior of vessel 150 may be exposed to a combination of temperature and gas composition which could give rise to metal dusting. That is, the pipe changes in temperature from the syngas temperature, of the order of 800-900° C., to the vessel temperature, of the order of 200° C., adjacent to the vessel, and the metal dusting temperature range lies within this temperature range. This length of pipe, which is likely to be less than five pipe diameters, is preferably constructed from material which is not susceptible to metal dusting, or utilizes an internal corrosion resistance coating.

By quenching the syngas in line 251a in this manner, a portion of the hot syngas in line 251 from reformer 110 is quenched to below 200° C., which is well below the metal dusting temperature range. The 200° C. flow of syngas in line 251a is then preferably mixed at point 253 with the other flow of syngas in line 251b, still at 800-900° C. The mixed temperature of the syngas is about 300° C., which is below the metal dusting temperature range and which is also in the temperature range suitable for the (High Temperature Shift) reactor 160. From reactor 160, the syngas may enter heat exchanger 122 still below the metal dusting temperature range.

There may be short lengths of pipe—less than five pipe diameters—adjacent to the mixing tee at point 253 where metal is exposed to a combination of temperature and gas composition which could give rise to metal dusting. These are preferably protected as mentioned above.

Thus, the potential metal dusting conditions are preferably localized outside the heat exchangers and other components of system 100 for which protection from metal dusting is difficult and/or expensive.

F. Reformer

Figure 17:
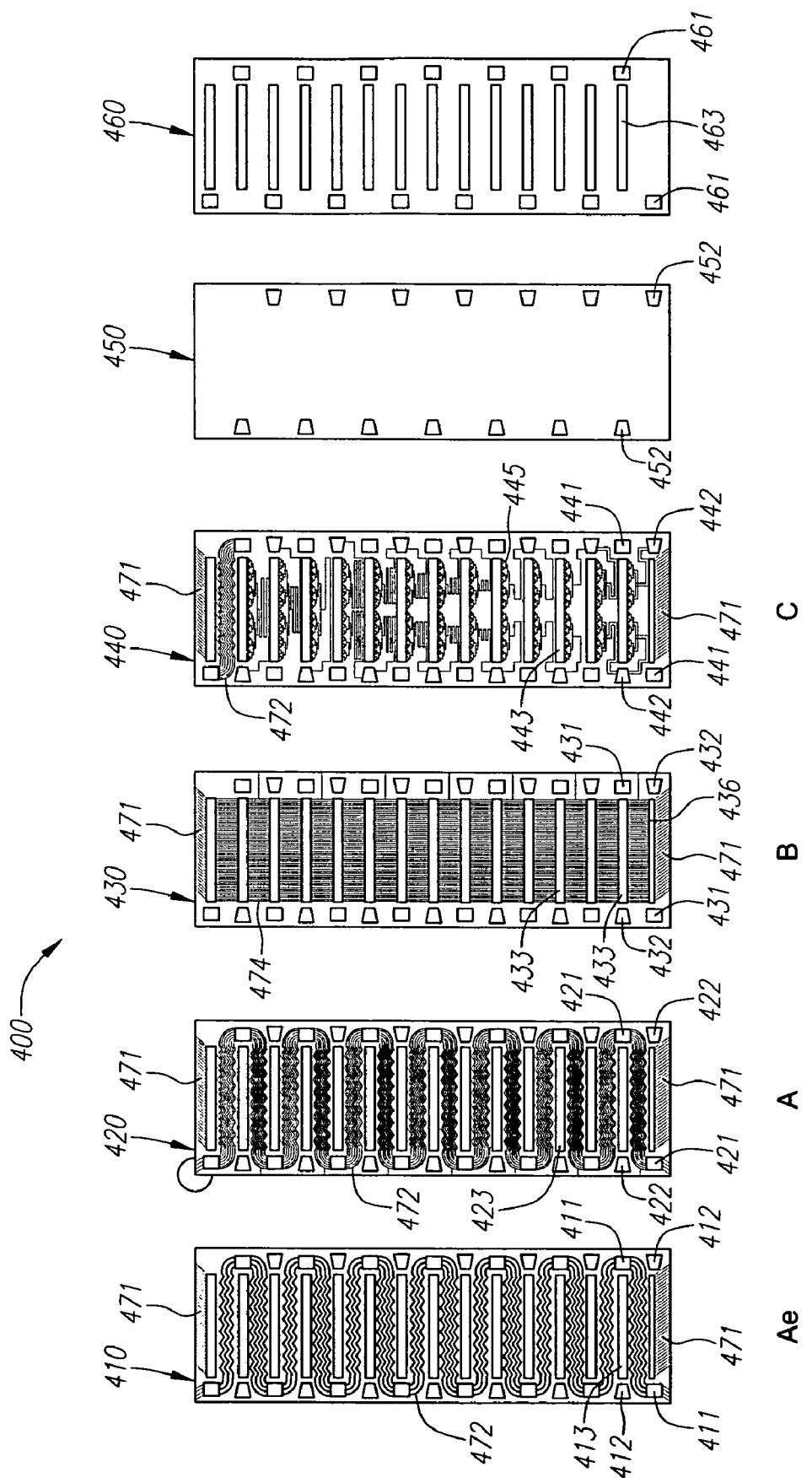
FIG. 17 shows plates for use in a stack of plates comprising a reformer.
Figure 18:
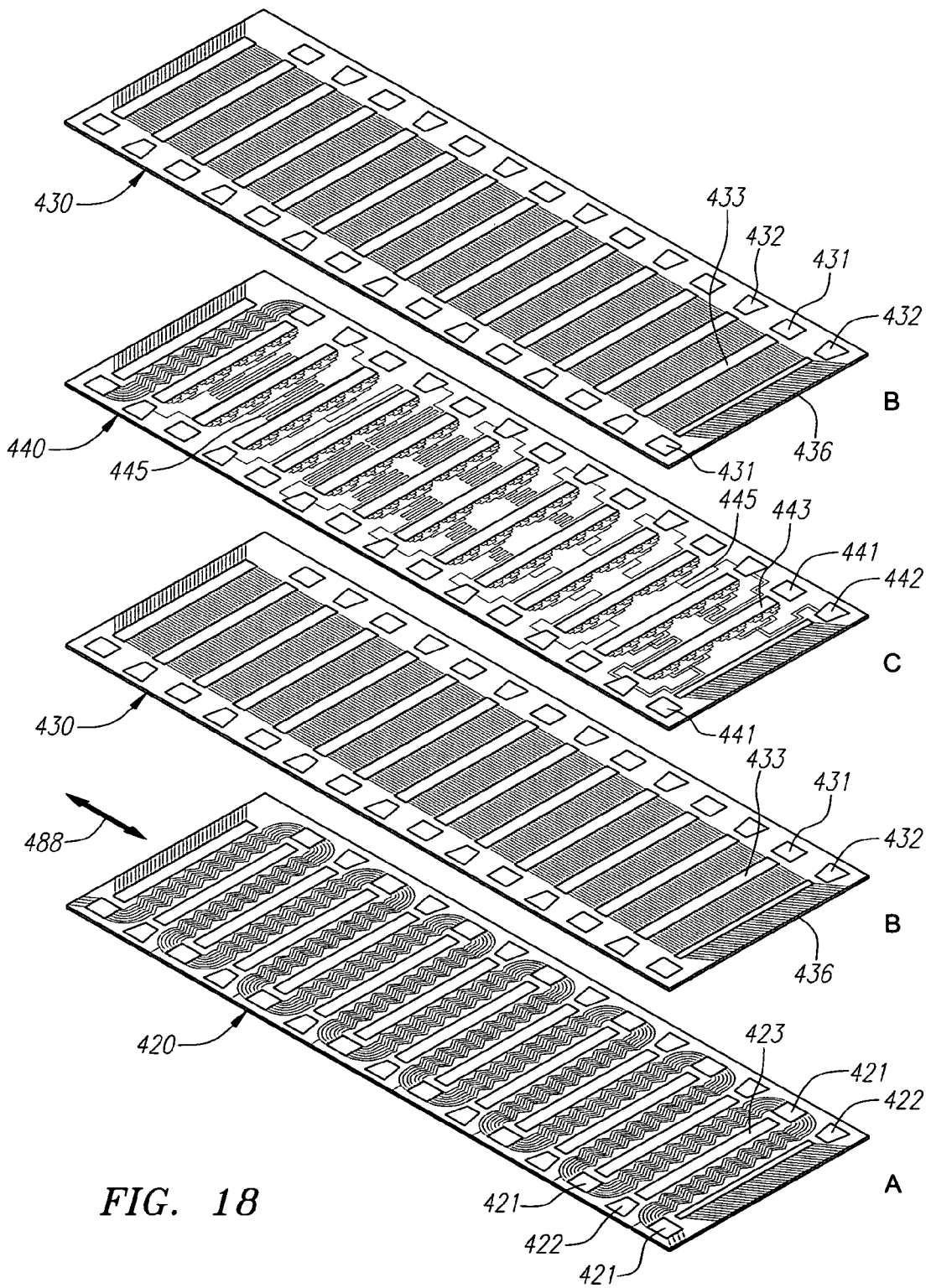
FIG. 18 shows how plates in the stack of FIG. 17 may be superposed.
Figure 19:
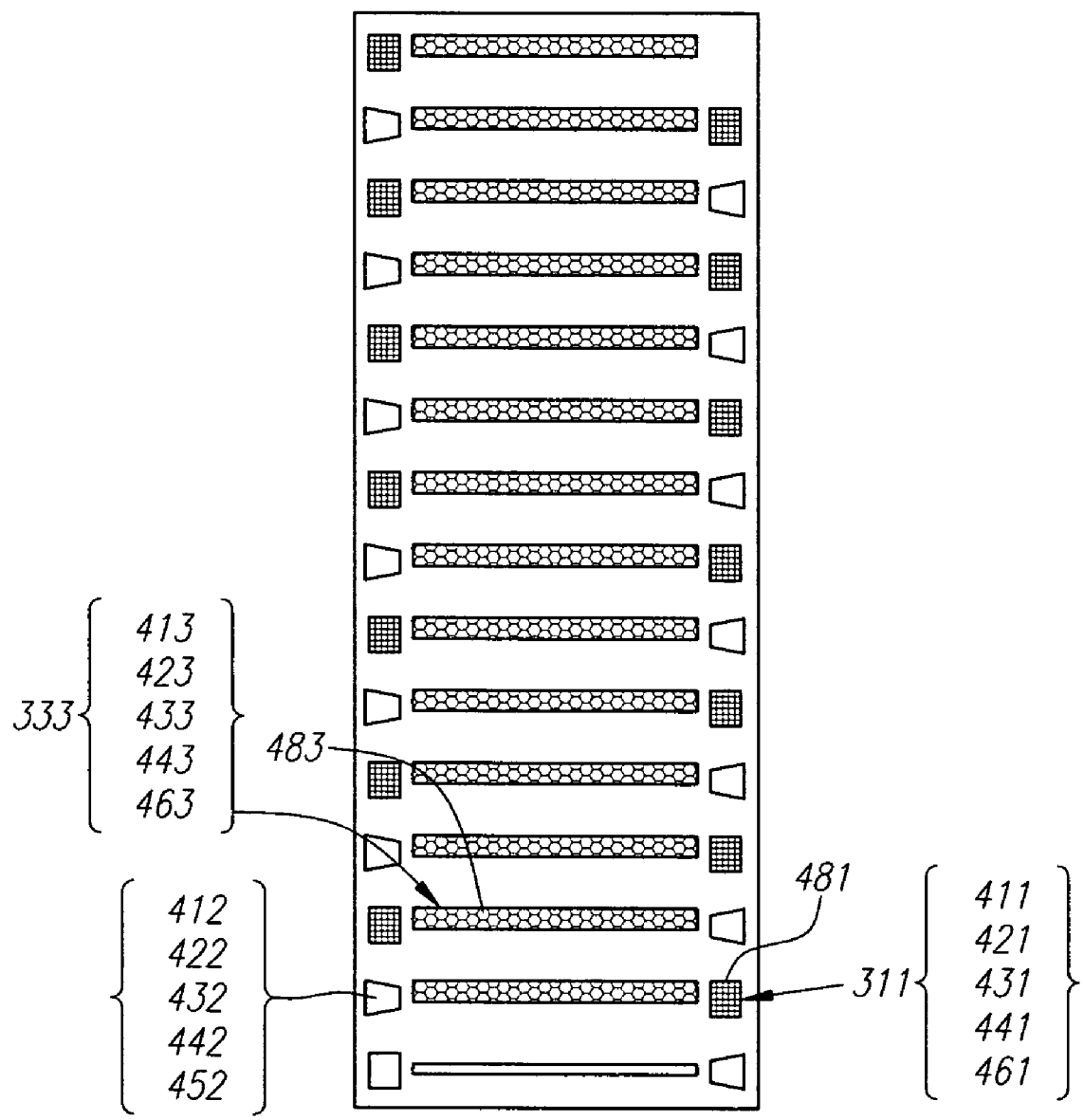
FIG. 19 shows catalyst beds formed by the superposition of plates in the reformer stack of FIG. 17.
Figure 20:
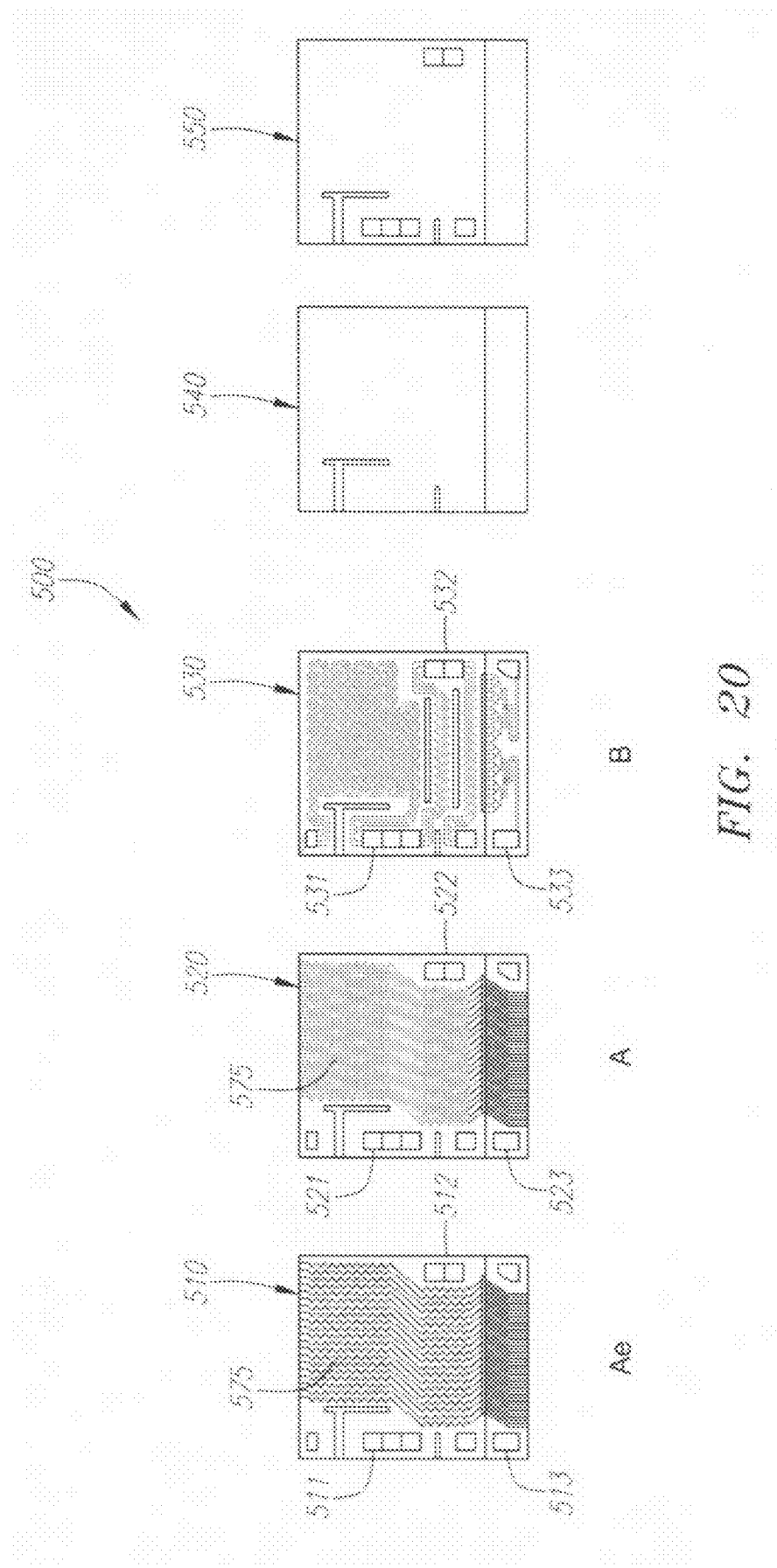
FIG. 20 shows plates for use in a stack of plates comprising a pre-reformer.
Figure 21:
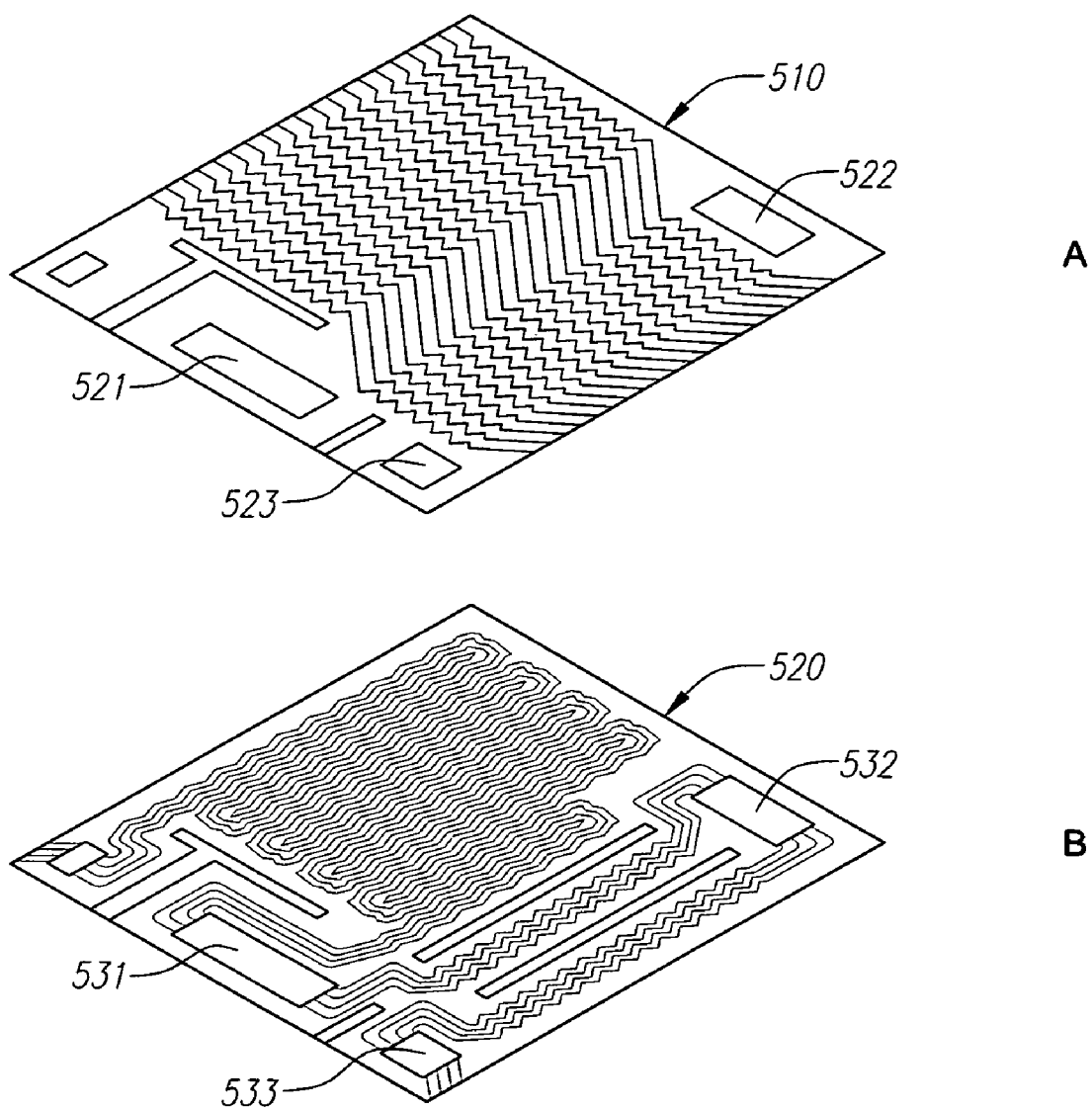
FIG. 21 shows how plates in the stack of FIG. 20 may be superposed.
Figure 22:
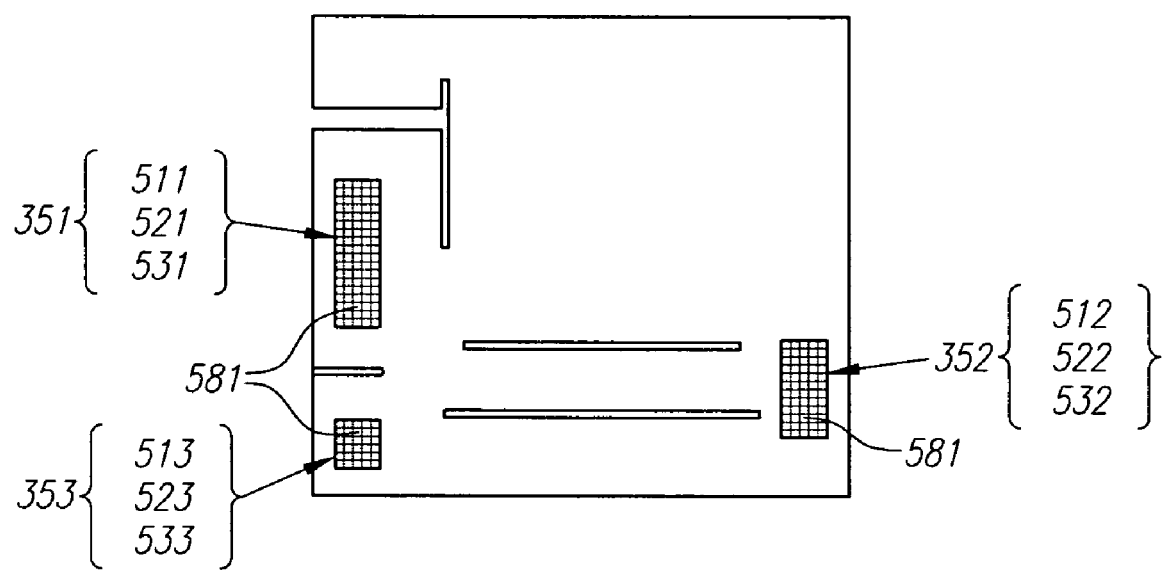
FIG. 22 shows catalyst beds formed by the superposition of plates in the pre-reformer stack of FIG. 20.

Additional aspects of the invention relating to reformer 110 are now discussed with reference to FIGS. 16-22. As schematically shown in FIG. 16, reformer 110 preferably includes reformer 112 and pre-reformer 114. Reformer 112 preferably comprises a stack of plates having channels as shown in FIGS. 17-19, and pre-reformer 114 preferably comprises a stack of plates having channels as shown in FIGS. 20-22.

The primary components of reformer 112 are now described. Reformer 112 generally comprises multiple adiabatic beds with inter-bed heat exchangers. In the embodiment of FIG. 16, reformer 112 preferably includes fourteen adiabatic beds or reforming stages, 301, 302, 203, etc. Each reforming stage preferably includes a reforming chamber 311, 312, 313, etc., in which the reforming reaction occurs, a heat exchanger 321, 322, 323, etc., where heat is transferred to the reforming reactants, and a combustion chamber 331, 332, 333, etc. where heat is release adiabatically in a combustion reaction. (In reformer stage 301, combustion chamber 331 is also referenced as combustion chamber 142 in FIG. 10.)

The configuration described above wherein the combustion and reforming chambers are separated by a heat exchange function is in sharp contrast to existing tubular systems. In existing tubular systems, heat generated in a combustion process is taken directly away for use in a reforming process. The amount of heat so taken is significant given the significant temperatures needed for reforming. This creates control issues, however, since the heat taken away from the combustion will affect the combustion reaction itself.

With the current invention, however, heat from the successive combustion chambers is not directly taken away for use in the associated reforming chambers. Instead, the heat is provided to the associated heat exchanger for transfer to the reforming reactants which then enter the associated but separate reforming chamber. As such, the combustion process and its associated temperature is easier to control. The combustion process is also easier to control in the current invention because only a fraction of the overall combustion occurs in each stage.

Referring again to FIG. 16, it should be noted that the fourteen stage embodiment of reformer 112 is only an example and is not intended to limit the invention. Nor is it necessary that the number of reforming and combustion stages should be equal. In fact, the invention specifically contemplates adiabatic beds of different sizes and/or the use of any number of multiple adiabatic beds so that reformer 100 may be scaled up or down to meet process requirements. Indeed, the printed circuit reformer design of the invention allows system 100 to be readily scaled up or down without the significant cost associated with scaling up or down a typical tubular reformer.

There are several ways in which the reformer of the current invention may be readily scaled. For example, where greater reforming capacity is required, the size of the reformer chambers may be increased by adding more plates to the stack. The channels in these additional plates will provide increased heat exchange surface to support the increased reforming reaction.

As another example, multiple stacks of plates may be located side by side. FIG. 28 shows an embodiment wherein two plates are configured side-by-side. The plates shown in FIG. 28 may each comprise one plate as shown in FIG. 17 configured side-by-side with its mirror image. The side-by-side configured plates of FIG. 28 are labeled similarly to the plates in FIG. 17, i.e., bounding plate 410' in FIG. 22 may comprise bounding plate 410 configured side-by-side with its mirror image. Syngas plate 420' may comprise syngas plate 420 configured side-by-side with its mirror image, air or combustion plate 430' may comprise plate 430 configured side-by-side with its mirror image and fuel plate 440' may comprise fuel plate 440 configured side-by-side with its mirror image.

As shown in FIG. 28, for example, bounding plate 410' may have openings 411 which contribute towards forming reformer chambers as discussed with FIG. 17. However, plate 410' may also include opening 411' which represents a larger opening that contributes to a larger reformer chamber. Similarly bounding plate 410' includes openings 412 to contribute to fuel ports, as well as opening 412' to contribute to a larger fuel port. Bounding plate 410' also includes openings 413 that contribute to combustion chambers.

The other plates 420', 430' and 440' also have similar openings that contribute to the reformer chamber, fuel ports and combustion chambers, as well as larger reformer chambers, i.e., 421', 431' and 441', and larger fuel ports, i.e., 422', 432' and 442'. Reforming catalyst and combustion catalyst may reside in the chambers formed by these openings.

It should be noted that reformer 112 may be scaled further upward by using bigger plates in which additional basic building plates are configured side-by-side.

Furthermore, adiabatic beds may be added by lengthening the plates and etching the additional microchannels necessary to the form additional adiabatic beds similar to stages 301, 302, 303, etc. This may require some relatively minor redesign in other aspects of the system 100, e.g., fuel distribution to each stage. However, the cost of the redesign effort would be significantly less than the cost of materials and engineering in adding reforming stages in a typical tubular system.

The operation of reforming stages 301, 302, 303, etc., is now more fully described. In each stage, reforming reactants are preheated prior to each reforming chamber in heat exchangers 321, 322, 323 etc by hot gases emerging from combustion chambers 331 (142 in FIG. 10), 332, 333 etc. As discussed later, this heat exchange preferably occurs in a crossflow manner.

Fuel is added to air line 227 in successive increments in lines 223a(2), 223a(3) etc., prior to the combustion chambers in order to provide an appropriate increment in air/flue temperature prior to the inter-bed heat exchangers.

As discussed later, the temperature of the reformate entering successive reforming chambers 311, 312, 313, etc. may be controlled by passively controlling the amount of fuel provided from line 223a to each combustion chamber. Controlling the fuel flow to each combustion chamber limits the temperature rise in the chambers and so limits the heat available through the heat exchangers to increase the temperature of the feeds entering the successive reforming chambers.

The primary components of pre-reformer 114 are now described. In the embodiment of FIG. 16, pre-reformer 114 preferably includes three pre-reforming stages 351, 352 and 353. Again, this is only an example number of pre-reforming stages. The invention specifically contemplates varying the number and other characteristics of the pre-reformer stages to scale the system 100 up or down to meet overall process requirements.

Referring again to the embodiment of FIG. 16, each pre-reforming stage preferably includes a pre-reforming chamber 361, 362 and 363, and a heat exchanger. Heat exchangers 372 and 373 may serve pre-reformers 362 and 363, respectively. Heat exchanger 371 (as shown in FIG. 10 where it is also references as item no. 130) may serve pre-reformer chamber 361.

Pre-reforming may be performed with a higher-activity catalyst that enables the reforming to take place at lower temperatures around 600° C. without the need for successive combustion chambers in each pre-reforming stage. Instead, the lower temperatures may can be obtained by using the flue gas in line 227 as the heat source. Pre-reforming decreases the load on the reformer 112 to allow for more methane conversion capacity.

Heat for the reactions occurring in pre-reformer chambers 361, 362 and 363 derives from the flue gas in heat exchangers 371 (as shown in FIG. 10 where it is also references as item no. 130), 372 and 373 respectively.

The manner in which reformer 112 and pre-reformer 114 may communicate with the rest of system 100 is now further described with reference to FIGS. 10 and 16. The fuel air mixture in line 223a from pre-combustion chamber 140 (FIG. 10) may enter reformer 112 and split off into successive offshoot feed lines 223a(2), 223a(3), 223a(4), etc. (FIG. 16), that lead to successive combustion chambers 332, 333, 334, etc., which in turn provide the heat for their associated heat exchangers and reforming chambers. Fuel line 223b (in FIG. 10) may combine with air line 221b in combustion chamber 142 producing hot stream 227 which in turn provides heat for the first reforming stage 301.

As discussed in more detail later, the configuration of these offshoot lines provides passive control over the amount of fuel provided to the combustion chambers which in turn controls the temperature of the reforming chambers as discussed later.

The air in line 227 from combustion chamber 142 (FIG. 10) may enter reformer 112 through heat exchanger 321 in the first reformer stage 301. After heat exchanger 321, this line may continue through each reformer stage 301, 302, 303, etc., mixing with successive offshoot fuel feed lines prior to entering the next combustion chamber and heat exchanger.

After line 227 exits the last heat exchanger 327 of the last reforming stage 307, it may pass through combustion chamber 339 en route to pre-reformer 114. This line may then travel through pre-reformer heat exchangers 373 and 372 and then exit pre-reformer 114 (and exit reformer device 10) via flue gas line 261.

Line 273, which contains the reformer feed reactants—a mixture of natural gas and steam—may enter reformer device 110 through pre-reformer 114 as shown. This line may then extend through pre-reformer stages 351, 352 and 353, and then proceed through heat exchanger 321 en route to the reforming chamber 311 of the first reforming stage 301 of reformer 112. This line may then pass through successive reforming stages and exit reformer 112 (and reforming device 110) via syngas line 251.

Reformer 112 preferably comprises a stack of plates each having desired channels incorporated therein by an etching or other suitable process. The plates are superposed on top of each other, thereby forming channels and chambers. FIG. 17 shows the preferred plates in the reformer stack. FIG. 18 shows the order in which certain plates in the reformer stack may be arranged. FIG. 19 shows the catalyst beds that are formed by the superposition of plates in the reformer stack.

As shown in FIG. 17, the reformer stack 400 preferably includes: bounding plate (Ae) 410, syngas plate (A) 420, combustion plate (B) 430, fuel plate (C) 440, top end plate 450 and bottom end plate 460. The plates may be arranged in the following order using the parenthetical designations noted above: Ae BCBA B C B A ... B C B Ae, wherein the underlined portion represents a cell that may be repeated within the stack to achieve the desired heat transfer. A perspective view of this cell is shown in FIG. 18. Increasing or decreasing the number of cells helps allow reformer 100 to be scaled up or down to meet process requirements.

In the preferred reformer stack 400 for producing approximately 5 standard cubic metres of hydrogen per hour from a downstream PSA unit, there are two bounding plates (Ae) 410 per stack, one syngas plate (A) 420 per cell, two combustion plates (B) 430 per cell and one fuel plate (C) 440 per cell. Also in a preferred embodiment, there is a bounding plate, five cells, an extra B C B arrangement of plates, another bounding plate and six endplates. This provides 25 active plates. The plates may be 1.60 mm thick and the preferred stack may be 49.6 mm. However, this number of plates and dimensions thereof are only examples and are not intended to limit the invention.

Channels 471 may have a 1.10 mm depth, a 2.49 mm width and a 0.50 mm ridge. Channels 472 may have a 1.10 mm depth, a 1.69 mm width and a 1.00 mm ridge. Channels 474 may have a 1.10 mm depth, a 1.69 mm width and a 0.90 mm ridge. Channels 445 may have a 1.10 mm depth, a 1.69 mm width and a 0.40 mm ridge. These channel dimensions are examples only and are not intended to limit the invention.

As shown in FIGS. 17 and 18, bounding plate 410 has multiple openings 411, syngas plate 420 includes multiple openings 421, combustion plate 430 includes multiple openings 431, fuel plate 440 includes multiple openings 441 and bottom end plate includes openings 461. When these plates are stacked as partially shown in FIG. 18, these openings are superposed on one another to form the reformer chambers 311, 312, 313 etc., described above with reference to FIG. 16. As shown in FIG. 19, the reformer chamber, e.g., 311 comprised of the superposed openings 411, 421, 431, 441 and 461 in the respective plates, may be filled with reforming catalyst 481. For comparison with FIG. 16, the first reforming chamber 311 is shown at the bottom of the plate.

Similarly, bounding plate 410 in FIG. 17 includes multiple openings 412, syngas plate 420 includes multiple openings 422, combustion plate 430 includes multiple openings 432, fuel plate 440 includes multiple openings 442 and top end plate 450 includes multiple openings 452. When these plates are stacked as partially shown in FIG. 18, the openings are superposed on one another to form fuel ports.

Similarly, bounding plate 410 in FIG. 17 includes multiple openings 413, syngas plate 420 includes multiple openings 423, combustion plate 430 includes multiple openings 433, fuel plate 440 includes multiple openings 443 and bottom end plate 460 includes multiple openings 463. When these plates are stacked as partially shown in FIG. 18, these openings are superposed on one another to form the combustion chambers 332, 333, 335, etc., described above with reference to FIG. 16. As shown in FIG. 19, the combustion chamber, e.g., 332 comprised of the superposed openings 413, 423, 433, 443 and 463 in the respective plates, may be filled with combustion catalyst 483.

Pre-reformer 114 also preferably comprises a stack of plates, each plate having desired channels incorporated therein by an etching or other suitable process. The plates are superposed on top of each other, thereby forming channels and chambers. FIG. 20 shows the preferred plates in the pre-reformer stack. FIG. 21 shows the order in which certain plates in the pre-reformer plates may be arranged. FIG. 22 shows the pre-reformer catalyst beds that are formed by the superposition of plates in the pre-reformer stack.

As shown in FIG. 20, pre-reformer stack 500 preferably includes: bounding plate (Ae) 510, combustion gas plate (A) 520, syngas plate (B) 530, top end plate 540 and bottom end plate 550. The plates may be arranged in the following order: Ae BA B A ... B Ae, wherein the cell BA may be repeated within the stack to achieve the desired heat transfer or scaling of reformer 100. A perspective view of this cell is shown in FIG. 21 wherein the bounding plate is in an A configuration. In any event, it is preferred that each B plate is surrounded by two A plates.

In the preferred pre-reformer stack 500 for producing approximately 5 standard cubic meters of hydrogen per hour from a downstream PSA unit, there are two bounding plates (Ae) 510 per stack, one combustion gas plate (A) 520 per cell and one syngas plate (B) per cell. In a preferred embodiment, there are a bounding plate (Ae), eleven cells, another B plate, a bounding plate (Ae) and six endplates. This provides 25 active plates. The plate thickness may be 1.60 mm and the stack may be 49.6 mm. However, this number of plates and dimensions thereof are only examples and are not intended to limit the invention. It is preferred that the overall height of pre-reformer 114 be the same or similar to the height of reformer 112.

Channels 571 (fuel lines) may have a 1.10 mm depth, a 1.69 mm width and a 1.0 mm ridge. Channels 573 may have a 1.10 mm depth, a 2.49 mm width and a 0.50 mm ridge. Channels 575 may have a 1.10 mm depth, 1.99 mm width and a 0.50 mm ridge. These channel dimensions are examples only and are not intended to limit the invention.

As shown in FIGS. 20 and 21, bounding plate (Ae) 510 includes openings 511, 512 and 513, combustion gas plate (A) 520 includes openings 521, 522 and 523, and syngas plate (B) 530 includes openings 531, 532 and 533. When these plates are stacked as partially shown in FIG. 21, these openings are superposed on one another to form the pre-reformer chambers 351, 352 and 353 described above with reference to FIG. 16. As shown in FIG. 22, the pre-reformer chambers 351, 352 and 353 comprised of the superposed openings, may be filled with reforming catalyst 581.

G. Fuel Distribution

An aspect of the invention relating to a fuel distribution network for controlling the temperature of the reforming reactions is now described with reference to FIGS. 16-24. In this aspect of the invention, the fuel lines in reformer 112 are configured to passively control the amount of fuel provided to each combustion chamber. This in turn preferably controls the amount of combustion occurring in a given combustion chamber, which in turn will control the amount of heat provided to the associated heat exchanger and reforming reactants, which in turn will control the temperature of the reformate in the associated reforming chamber.

The amount of pressure drop in a fuel line determines the volume of fuel that is delivered into the combustion chamber 443 per unit time. Pressure drop may be adjusted in a given fuel line by, for example, varying the length of the fuel line, whereby increasing the fuel line length results in pressure drop. Increasing the number of turns in the fuel line and/or increasing the severity of those turns will also result in pressure drop. Changing these fuel line characteristics thus adjusts the amount of "resistance" encountered by the flow of fuel in a given fuel line en route to the combustion chamber, and may thus control the amount of fuel provided per unit time.

The amount of fuel provided to a given combustion chamber may also be passively controlled by varying the number of fuel lines feeding that particular combustion chamber. To this end, where there is lower pressure drop, an increased number of fuel lines may be used.

Because the efficiency of the reforming reaction is temperature dependent, controlling the amount of fuel fed to each combustion chamber preferably increases efficiency of the overall reformer system 100. Successive reformer stages 301, 302, 303, etc., of reformer 112 may require varying amounts of heat from the successive combustion chambers to operate efficiently. To increase system efficiency, the amount of fuel provided preferably varies on a stage-by-stage basis with the fuel feed lines being configured for the particular stage.

As noted above, it is preferred that the control provided by tuning the fuel line configurations is passive. In other words, the fuel line configurations themselves provide the control without the need for affirmative control mechanisms. To this end, it is preferred that the fuel lines are tuned for the parameters of a particular system. In system 100 of the current invention, for example, each channel which feeds fuel to a combustion chamber may be etched or otherwise formed according to a desired fuel line configuration to provide a desired resistance. After the system is manufactured with the fuel lines so configured, additional active control mechanisms are preferably unnecessary.

The passive control aspect of the invention simplifies the overall control of reformer 100, 101 or 102 by avoiding control loops involving temperature measuring and fuel flow adjustment devices which are used in existing systems which add complexity and cost. This simplicity is beneficial at both design conditions and at high turndown ratios.

The passive fuel control aspect of the invention also allows the reformer 100, 101 or 102 to be scaled down in size because fuel control is accomplished by the channels etched or otherwise formed into the fuel plates of reformer 112, and not by bulky control systems.

If it is desired to scale a particular system up or down by increasing the number of adiabatic beds in the reformer, some effort may be necessary to redesign the fuel lines so that the appropriate amount of fuel is provided to each reformer stage. But once the fuel lines are so designed, passive control again exists without the need for active control mechanisms. This is in sharp contrast to the amount of design engineering that would be necessary to adjust the fuel delivery system in a typical tubular reformer.

Fuel line configurations are now discussed in more detail with reference to FIGS. 17 and 18 which show plates in the reformer stack 400 of reformer 112, including fuel plate (C) 440. As discussed earlier, reformer stack 400 preferably includes five cells comprising the BCBA plates and an additional fuel plate near the end of the stack. As such, reformer 112 may include six fuel plates. The number of plates are examples only and are not intended to limit the invention. Indeed, additional plates may be added to provide more fuel for a scaled-up reformer.

Each fuel plate 440 may include multiple fuel ports 442. In a preferred embodiment, fuel plate 440 includes fifteen fuel ports. Fuel lines 445 may extend from each fuel port to its associated combustion chamber 443. (In FIG. 16 and in FIG. 24 discussed later, the fuel lines are represented by reference numerals 223a(2), 223(a)(3), 223(a)(4), etc.) As shown in FIG. 17, the number of fuel lines 445 may vary for each stage, as may the length of each fuel line, the number of bends in each fuel line and the severity thereof.

To reduce the number of parameters that may need to be considered in arriving at the appropriate resistance to be provided by each fuel line, and for ease of manufacturing the fuel line channels, it is preferred that fuel lines 445 feeding the respective combustion chambers each have the same cross sectional dimension. It is also preferred that all fuel lines 445 be configured for laminar flow so that the pressure drop is a direct function of flow for all fuel lines. As such, due to the linear variation in flow relative to pressure drop, the ratios of the fuel flow and air flow at each stage of combustion may remain relatively constant despite significant turndown of reformer 100, 101 or 102, for example, as discussed in connection with FIG. 28.

Besides fuel plate (C) 440, reformer stack 400 also includes combustion or air plate (B) 430. In a preferred embodiment, the reformer stack 400 may include six combustion plates, though this is an example and is not intended to limit the invention. Indeed, the number of air plates 430 may be increased or reduced to scale system 100, 101 or 102, for example, as discussed in connection with FIG. 28.

As shown, combustion plate 430 includes air lines or capillaries 435 which provide air to the combustion chambers which helps fuel the combustion therein. Preferably, air is fed into one end 436 of combustion plate 430. The air so fed may be provided by lines 221a and 221b (with reference to FIG. 10 and to FIG. 24 discussed later). The air may then flow along the air capillaries 435 to each of the combustion chambers.

The delivery of air and fuel to the combustion chambers is preferably balanced by the design of the plates 430 and 440. It is preferred that the pressure of the air arriving through air lines 435 and the pressure of the fuel arriving through fuel lines 445 match at the combustion chamber to produce the desired amount of combustion for that particular chamber. This in turn will produce the appropriate amount of heat to the reforming reactants as they enter the associated reforming chamber. It is also preferred that the pressure drops are established so that the overall fuel pressure is just above atmospheric. However, other pressure drops may be established within the scope of the current invention.

Figure 23:
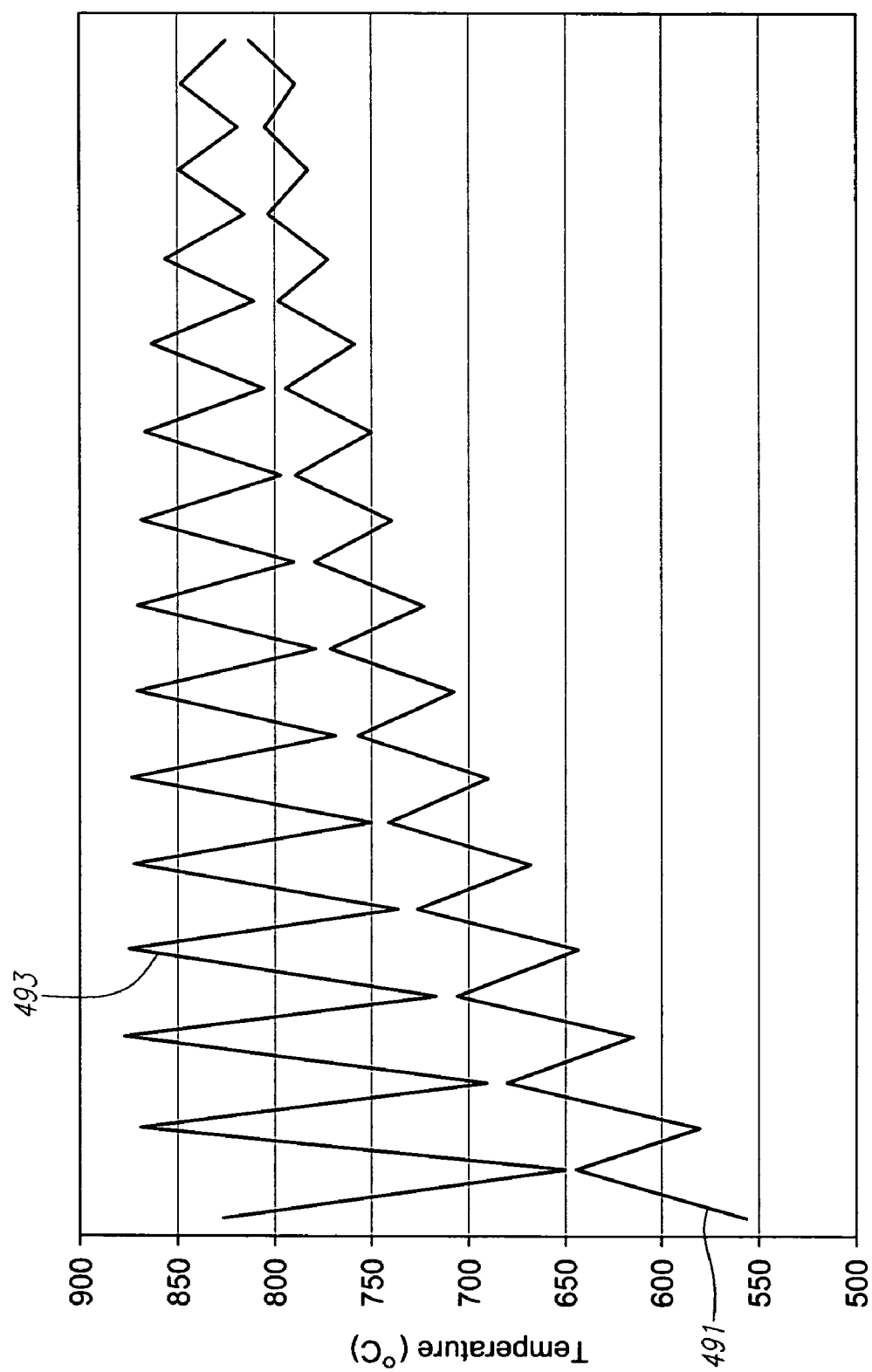
FIG. 23 shows temperature profiles of the reformate and fuel.

To operate reformer 112 in an efficient manner but within the material design temperatures, it is desirable to achieve a suitable combustion temperature profile and reformate temperature profile. FIG. 23 depicts a preferred temperature profile over the stages of reformer 112. In this embodiment, the reformate temperature as it flows through each of the reforming chambers 311, 312, 313, etc., is shown by the lower line 491. The temperature of the fuel as it flows into each of the combustion chambers 332, 333, 334, etc., is shown by the upper line 493. These profiles may be based on a 14 bar reformer using PSA off gas as fuel.

In the preferred temperature profile, it is also preferred that the temperature of the feed/syngas generally increases as the reforming reaction progresses, and the hydrogen content increases. It is helpful if hydrogen content "leads" the temperature increase, as this lowers the likelihood that formation of coke will be favored in the reformer.

Figure 24:
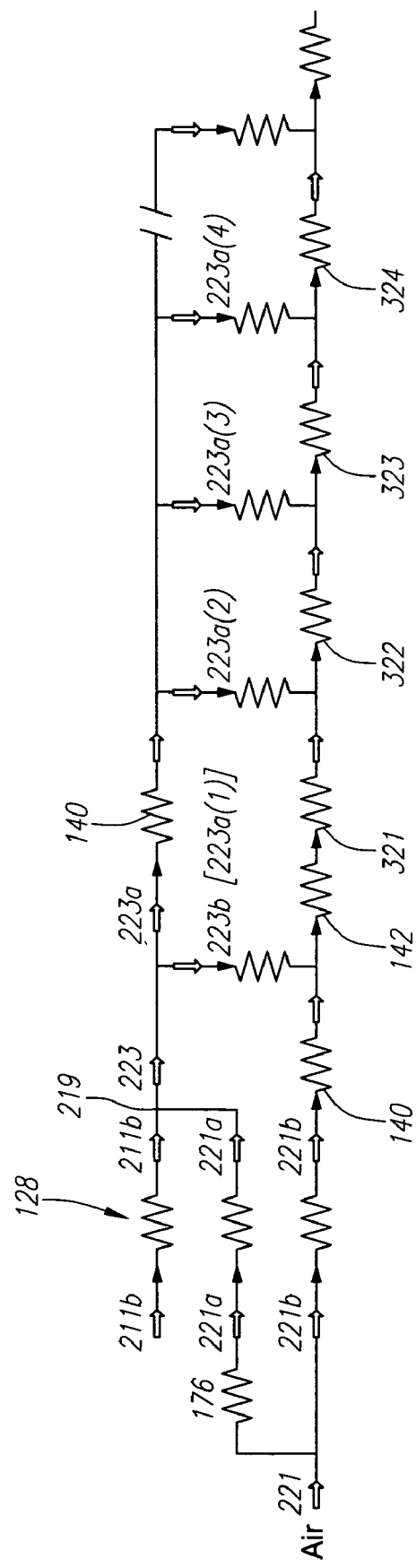
FIG. 24 shows a fuel air resistance network.

The resistances within the fuel distribution network as shown in FIG. 24 are preferably tuned so that the amount of fuel delivered to each combustion stage through successive lines 223a(1), 223a(2), 223a(3), etc., diminishes over the length of the reformer despite the fact that the pressure drop driving the fuel flow increases. This is generally because the amount of reforming diminishes at each successive reforming stage. As such, the amount of heat required diminishes over successive stages thereby requiring that less fuel be provided to the successive combustion chambers.

The proportion of fuel passing down each of the fuel lines 223a(1), 223a(2), 223a(3), etc., or distributors D1, D2, D3, etc., may be as listed in the table below:

| Distributor | % Fuel flow |
|---|---|
| 223a(1) D-1 | 18.6% |
| 223a(2) D-2 | 10.4% |
| 223a(3) D-3 | 9.8% |
| D-4 | 8.9% |
| D-5 | 8.1% |
| D-6 | 7.7% |
| D-7 | 6.9% |
| D-8 | 6.3% |
| D-9 | 5.5% |
| D-10 | 4.9% |
| D-11 | 4.1% |
| D-12 | 3.5% |
| D-13 | 2.8% |
| D-14 | 2.5% |

It is preferred that a high degree of precision not be required in the rate of fuel distribution. However, the rate of fuel addition to each stage generally falls, as the reformer temperature increases, in order to keep reforming temperatures below, but close to, the material design temperature for the equipment. In the case illustrated, the design temperature may be on the order of 820° C. Higher temperatures may favor methane conversion within the reformer, but may also create more severe operating conditions for the materials of construction. Because the heat transfer coefficients of the gases on the reforming side are considerably higher than those on the combustion side, the metal temperature tends to stay close to the reforming gas temperature, and hence the combustion gas temperatures may exceed the material design temperature.

In order to achieve the fuel/air mixtures throughout the reformer which will achieve the desired temperature profiles, the heat exchange and mixer (combustion) components are preferably designed to fulfil their primary functions as heat exchangers and mixers (combustion chambers). However, it is preferred that their pressure drops also correspond to those required for sound fuel/air mixing. Their pressure drops are also preferably low—of the order of 10 kPa or less in total—as high pressure drop of air consumes relatively large blower power. Fuel may also be pressure-drop sensitive. Where it is the tail gas from a PSA (Pressure Swing Absorption) system, for example, a high fuel pressure drop, requiring high fuel inlet pressure, will lower the efficiency of the PSA system.

There are two routes to any point at which fuel and air may mix, and in operation of the equipment, the flows down the branches preferably self-adjust so that the pressures at the mixing point match. Thus the following constraints may be placed upon the design pressures and pressure drops of the components in the fuel/air system resistance network of FIG. 24:

$$P_{f\text{-}2} = P_{f\text{-}1} - DP_{E\text{-}100F} = P_{a\text{-}0} - DP_{E\text{-}100FA} - DP_{VLV\text{-}104}$$

$$P_{a\text{-}3} = P_{f\text{-}2} - DP_{D\text{-}1} = P_{a\text{-}0} - DP_{E\text{-}100A} - DP_{MIX\text{-}1}$$

$$P_{cgc\text{-}1} = P_{f\text{-}2} - DP_{PC\text{-}100} - DP_{D\text{-}2} = P_{a\text{-}3} - DP_{MIX\text{-}2} - DP_{HEC\text{-}1}$$

$$P_{cgc\text{-}2} = P_{f\text{-}2} - DP_{PC\text{-}100} - DP_{D\text{-}3} = P_{cgc\text{-}1} - DP_{HEC\text{-}2}$$

$$P_{cgc\text{-}3} = P_{f\text{-}2} - DP_{PC\text{-}100} - DP_{D\text{-}4} = P_{cgc\text{-}2} - DP_{HEC\text{-}3}$$

etc. . . .

A suitable solution satisfying the above constraints is shown in the table below where reference numerals used in both FIGS. 16 and 24 are shown.

| Component | DP(kPa) |
|---|---|
| E-100A (128) | 3.08 |
| E-100F (128) | 1.05 |
| E-100FA (128) | 1.87 |
| MIX-1 (140) | 0.10 |
| MIX-2 (142) | 0.09 |
| HEC-1 (321) | 0.37 |
| HEC-2 (322) | 0.40 |
| HEC-3 (323) | 0.43 |
| HEC-4 (324) | 0.45 |
| HEC-5 | 0.48 |
| HEC-6 | 0.50 |
| HEC-7 | 0.52 |
| HEC-8 | 0.54 |
| HEC-9 | 0.56 |
| HEC-10 | 0.57 |
| HEC-11 | 0.59 |
| HEC-12 | 0.60 |
| HEC-13 | 0.61 |
| VLV-104 | 0.00 |
| 223a(1) D-1 | 1.07 |
| 223a(2) D-2 | 1.93 |
| 223a(3) D-3 | 2.32 |
| 223a(4) D-4 | 2.73 |
| D-5 | 3.17 |
| D-6 | 3.62 |
| D-7 | 4.10 |
| D-8 | 4.61 |
| D-9 | 5.12 |
| D-10 | 5.66 |
| D-11 | 6.23 |
| D-12 | 6.77 |
| D-13 | 7.33 |
| D-14 | 8.04 |

Beyond a satisfactory flow-distribution solution arising at the design point, it is preferred that a suitable flow distribution be maintained during turndown conditions. When components D-i, MIX-i, PC-i and HEC-i are designed such that the pressure drop is essentially proportional to the flow rates (that is, the flow is essentially laminar), sound fuel distribution may be maintained to very low turndown conditions, as shown in the table below for 10% capacity operation. In developing this table, it is assumed that air flow varies proportionately to capacity, but no further control of the fuel/air system is required. In straight pasages, flow is essentially laminar when Reynolds Number is less than 2000.

| Distributor | % Fuel flow, design capacity | % Fuel flow, 10% capacity |
|---|---|---|
| 223a(1) D-1 | 18.6% | 18.3% |
| 223a(2) D-2 | 10.4% | 8.8% |
| 223a(3) D-3 | 9.8% | 8.9% |
| 223a(4) D-4 | 8.9% | 8.6% |
| D-5 | 8.1% | 8.1% |
| D-6 | 7.7% | 7.8% |
| D-7 | 6.9% | 7.2% |
| D-8 | 6.3% | 6.7% |
| D-9 | 5.5% | 6.0% |
| D-10 | 4.9% | 5.3% |
| D-11 | 4.1% | 4.5% |
| D-12 | 3.5% | 3.9% |
| D-13 | 2.8% | 3.1% |
| D-14 | 2.5% | 2.8% |

Referring back to FIG. 17, in essence the design is a four way balance between air pressure drop in the combustion or air plate 430, fuel pressure drop in the fuel plate 440, the heat required by the endothermic reforming reaction in the reforming chamber and limiting the maximum temperature produced in the combustion chambers.

To simplify the surrounding system requirements, the fuel plate 440 and combustion plate 430 are preferably configured to provide a reduced or minimum pressure drop. As mentioned above, the air and fuel are delivered to the combustion chamber slightly above atmospheric pressure. This preferably eliminates the need for fuel compression to accomplish the matching of the four variables. This is beneficial because fuel compression would add cost, complexity and unreliability to the system.

Therefore, the design of the fuel lines 445 may control the amount of fuel being delivered into each of the respective combustion chamber with only one exterior variable in terms of fuel supply having to be controlled, and that is pressure of the fuel as it is being provided to the fuel manifold that feeds each of the fuel ports. The fuel pressure is preferably controlled to maintain the flue gas temperature at a level to limit the maximum overall reformer temperature while supplying the heat required by the endothermic reforming reaction. The need for compression of the fuel is preferably eliminated by designing all of the capillaries for minimum pressure drop.

The fuel distribution system described above provides several benefits over the prior art. For example, the metered addition of fuel to each stage preferably limits the heat which may be added to each stage thereby eliminating the balance of combustion, heat transfer and reforming reaction both radially and axially that must be achieved in tubular reformers. Furthermore, the inter-stage heat exchangers are of microstructure (PCHE) construction, which supports higher heat transfer coefficients and minimizes equipment size and high alloy usage thereby reducing cost. In addition the heat exchangers are readily characterized by engineering analysis without the need for expensive product full scale tests to validate performance.

While the heat exchange equipment is preferably microstructured, as shown in FIG. 19, the reforming chambers, e.g., 311, and combustion chambers, e.g., 333, holding the reforming catalyst 482 and combustion catalyst 483 are not. Accordingly, the catalysts may be of conventional pellet or monolith type. Where pellets are employed, they are preferably crushed in order to increase surface area and enhance catalyst effectiveness, thereby further reducing equipment size. The inter-stage printed circuit heat exchangers, e.g., 321, 322, 323, etc., may be configured to provide suitably large face area and short flow path required for low pressure drop through the crushed catalyst beds.

A major consumer of mechanical power in compact reforming systems is combustion air compression. Therefore, combustion side pressure drop is preferably minimized on the order of 0.1 bar or less.

Furthermore, for system simplicity and to minimize mechanical power consumption, fuel compression is preferably avoided. It is also preferred that reformer 101 accept low pressure fuel on the order of 0.1 bar gauge. To provide a suitable pressure to downstream process such as pressure swing absorption for hydrogen production or methanol synthesis, syngas is preferably provided at pressures of 10 bar or more. Since compression of syngas is mechanically inefficient compared to the compression of the natural gas feed, the reforming process preferably operates at pressures of 10 bar or more.

H. Flow Arrangements

Another aspect of the current invention involving flow arrangements within reformer 110 is now further described. In a preferred embodiment, a cross-flow arrangement is used for the heat exchange aspect of the process and a co-flow arrangement may be used for the reforming aspect of the process.

In some printed circuit heat exchangers, the combustion gas and the reforming gases may generally be configured in a counterflow arrangement but may employ a number of cross-flow passes to achieve the counterflow effect. In this situation, to achieve the counterflow effect, an amount of plate area may be inactive for heat transfer. To this end, syngas may be led from each reforming bed to the far edge of the inter-stage heat exchanger before it enters the heat exchanger, and is then led from the near end of the heat exchanger to the succeeding reforming bed.

The areas consumed in leading the syngas between the far and near ends of the heat exchanger to and from the reforming beds may be ineffective for heat exchange, and may thus compromise the efficiency of reformer material utilization. Also, multi-passing the syngas stream at each stage may limit the width of each plate element, if pressure drop were not to become excessive, and thereby compound the loss of efficiency of reformer material utilization as the proportion of plate area which is ineffective for heat exchange is held high.

An aspect of the invention involves the use of a cross-flow arrangement in the heat exchange aspect since this arrangement permits increased efficiency in terms of the area of the device devoted to heat exchange duties. To this end, the cross-flow heat exchanger component may be coupled with the co-flow reforming chamber component to produce satisfactory temperature profiles (that is, as to the temperature range of the reformate as it travels from one reforming chamber to the next within the series of reforming stages).

An issue with this configuration concerns the possible variation in the temperature at the outlet of the heat exchanger. This is an issue because a significant variation in the heat exchanger outlet temperature would result in a wide variation in reaction characteristics in the associated downstream reformer chamber and catalyst.

Figure 26:
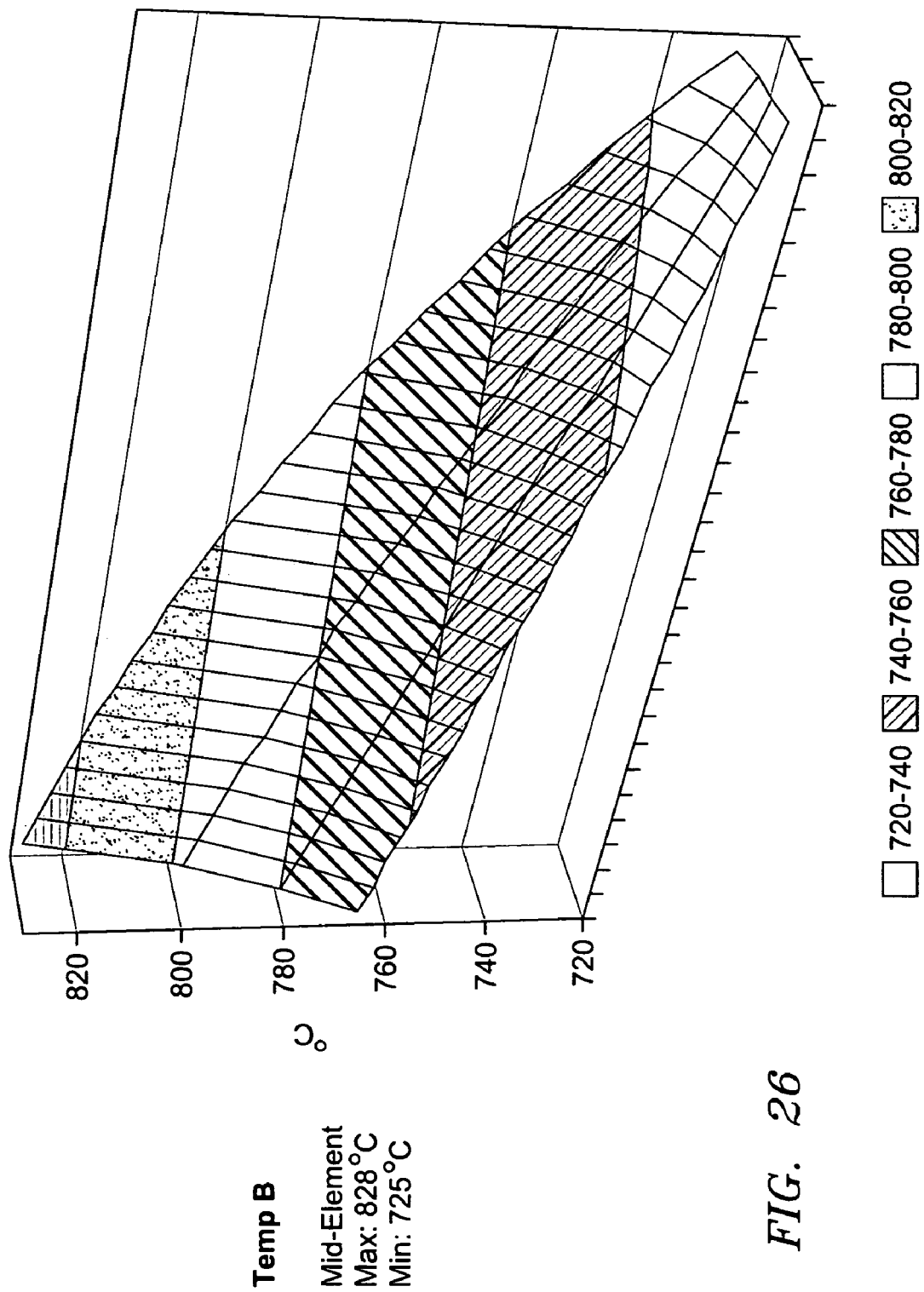
FIG. 26 shows a temperature distribution without taking wall conduction into account.

With respect to the eighth heat exchanger of reformer 112, assuming that the fluid enters at a uniform temperature of about 730° C., and without considering wall heat conduction, studies showed that the fluid exited the heat exchanger with a temperature range of about 765° C. to 825° C. This is shown in FIG. 26. This variation of 60° C. would result in the wide variation in reforming reaction characteristics as noted above.

Figure 27:
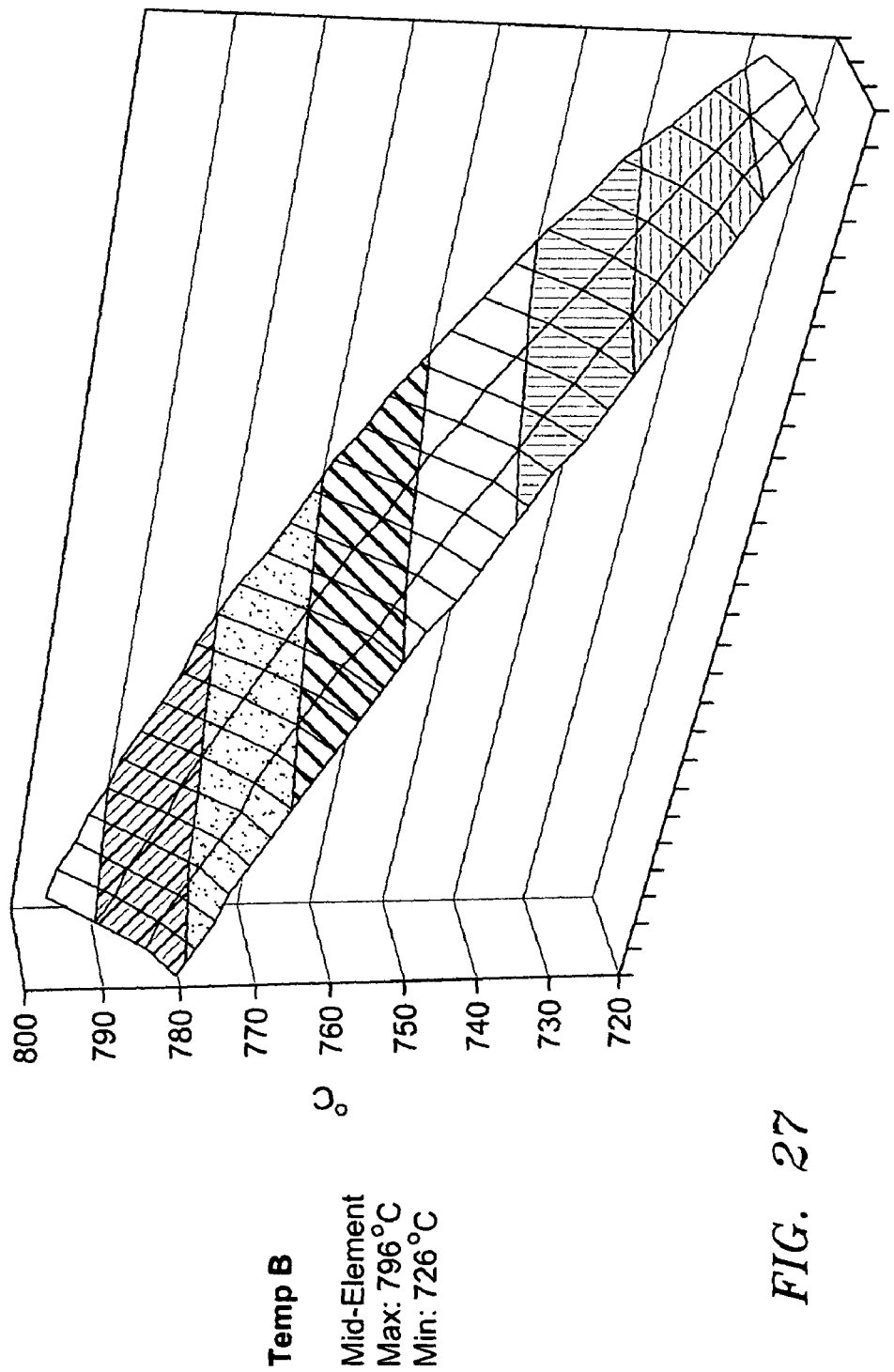
FIG. 27 shows a temperature distribution taking wall conduction into account.

However, when examining the effect of heat conduction in the wall between fluids, e.g., in the direction of arrow 488 on plate 420 in FIG. 18, it is seen that wall conduction effects resulted in the heat exchanger outlet temperature range being significantly less, e.g., on the order of about 15° C. in the example of the eighth heat exchanger, or from about 780° C. to about 795° C. This is shown in FIG. 27.

The narrow exit temperature range results from the fact that the walls of the heat exchanger of the current invention are preferably thicker than those of typical finned heat exchangers. As such, there is lengthwise conduction along the wall which serves to reduce the range of exit temperatures. Thus, it is preferred to use simple cross flow contact in the heat exchangers which allows higher utilization of the plates for heat exchange.

The use of cross-flow preferably avoids the need to lead the syngas from one end of the heat exchanger to the other that had existed to achieve counter-flow heat exchange characteristics. This also reduces the number of turns required and the plate space to accommodate such turns. As such, the use of cross-flow generally decreases the amount of plate area required for heat exchange.

Furthermore, by reducing the number of turns, pressure drop is decreased which in turn decreases the need for extra channels. The cross-flow arrangement also preferably allows the use of wider plate elements without generating undue pressure drop on the reforming side.

The use of an overall co-flow configuration for the reforming aspect of the process also preferably decreases temperature control accuracy requirements. This is because as the combustion and reformate streams flow in the same direction over the length of the co-flow configuration, their temperatures will tend to converge. As such the combustion and reformate streams preferably run in the same direction, i.e., co-flow, thereby creating exit temperatures of both streams that may approach the same value. As such, a lesser amount of control over the input temperatures is necessary can be controlled to looser tolerances. The complexity, cost and response time of the control system can be enhanced with an overall co-flow reformer.

Variations and modifications may be made in respect of the fuel processor and its component parts as above described without departing from the scope of the invention as defined in the appended claims. For example, the order of plate stacking, the positioning of the various reaction zones and the dispositions and configurations of the various channel arrangements may be changed extensively from those that have been described and illustrated.

The invention claimed is:

1. A reforming apparatus, comprising:
    a multiple adiabatic bed reformer, including;
        a stack of plates bonded together, each plate having paths and openings formed therein, wherein the paths form microchannels and the openings form chambers when the plates are bonded together to form the stack;
        successive reforming chambers which are formed by a first group of openings when the plates are bonded together to form the stack and into which reforming reactants are fed through a first group of microchannels and in which successive reforming reactions occur,
        successive combustion chambers which are formed by a second group of openings when the plates are bonded together to form the stack and into which air and fuel are fed through a second group of microchannels and in which successive combustions occur to provide heat to the reforming reactants through heat exchangers, and wherein the heat exchange occurs through a cross-flow configuration; and
        a fuel distribution system comprising a plurality of separate fuel delivery microchannels that form a portion of the second group of microchannels and wherein each separate fuel delivery microchannel extends to a designated combustion chamber, wherein the fuel delivery microchannels are configured to provide fuel to their designated combustion chambers in laminar flow, and wherein at least a portion of the fuel delivery microchannels are configured to provide a decreasing amount of fuel to each successive combustion chamber in a passively controlled manner.

2. The reforming apparatus of claim 1, wherein the successive reforming chambers contain a reforming catalyst and the successive combustion chambers include a combustion catalyst.

3. The reforming apparatus of claim 1, wherein heat from the gases produced by the multiple adiabatic bed reformer is transferred through at least one heat exchanger to preheat gases being fed into the adiabatic bed reformer and to create steam for the reforming reactions.

4. The reforming apparatus of claim 1, further comprising a combustion chamber that is located upstream from the multiple adiabatic bed reformer and that is configured to heat the fuel to a temperature above temperatures associated with metal dusting conditions so that metal dusting conditions are avoided in the multiple adiabatic bed reformer.

5. The reforming apparatus of claim 4, further comprising a heat exchanger that is located upstream from the multiple adiabatic bed reformer to heat the reforming reactants and/or fuel prior to entering the multiple adiabatic bed reformer.

6. The reforming apparatus of claim 1, wherein the fuel delivery system is configured such that the number of turns and/or the length of the microchannels provide a decreasing amount of fuel to each successive combustion chamber.

7. A reforming apparatus, comprising:
    a multiple adiabatic bed reformer that includes successive reforming chambers in which successive reforming reactions occur, and that includes successive combustion chambers in which successive combustions occur to provide heat to the successive reforming chambers; and
    a fuel distribution system that passively controls the amount of fuel provided to the successive combustion chambers for controlling the heat provided to the successive reforming chambers;
    wherein the fuel distribution system includes successive pluralities of fuel streams each extend to a designated combustion chamber, and the number of the fuel streams and/or the length of the fuel streams in each plurality is configured to passively control the amount of fuel provided to each successive combustion chamber by varying the resistance encountered by the fuel as it travels to each successive combustion chamber.

8. The reformer apparatus of claim 7, wherein the number of the fuel streams or the length of the fuel streams in each plurality is varied for each successive combustion chamber.

9. The reformer apparatus of claim 7, wherein the number of the fuel streams is decreased and/or the length of the fuel streams is increased for each successive combustion chamber.

10. The reformer apparatus of claim 9, wherein the decreased number of fuel streams and/or increased length of the fuel streams of the fuel distribution system provides a decreasing amount of fuel to at least some of the successive combustion chambers.

11. The reformer apparatus of claim 7, wherein the multiple bed adiabatic reformer comprises a printed circuit reformer.

12. The reformer apparatus of claim 7, wherein the fuel streams in each plurality have the same cross sectional dimension.

13. The reformer apparatus of claim 7, further comprising a plurality of air streams extending to each successive combustion chamber, wherein the air streams and plurality of fuel streams extending to each successive combustion chamber are configured to provide air and fuel such that the ratios of fuel flow and air flow to each combustion chamber remain relatively constant during turndown of the reformer apparatus.

14. The reformer apparatus of claim 13, wherein the fuel streams and air streams in each plurality are configured to provide laminar fuel flow and laminar air flow.

15. A reformer apparatus configured for small scale operation, comprising:
    feed streams of reforming reactants, fuel and air;
    a printed circuit multiple adiabatic bed reformer that includes successive reforming chambers in which successive reforming reactions occur, successive combustion chambers in which successive combustions occur, and reforming reactant microchannels, a plurality of separate fuel delivery microchannels, and air microchannels for the reforming reactants, fuel and air;

at least one printed circuit heat exchanger that captures and transfers heat from at least one stream exiting the printed circuit reformer to at least one of the feed streams; and a fuel delivery system that includes the plurality of separate fuel delivery microchannels, wherein each separate fuel delivery microchannel extends to a designated combustion chamber and which have a number of turns and/or lengths that are configured to passively control the amount of fuel provided to the successive combustion chambers, wherein the fuel delivery microchannels and air microchannels are configured to provide fuel and air such that the ratios of fuel flow and air flow to each combustion chamber remains relatively constant during turndown of the reformer;

wherein the fuel delivery system is configured to provide sufficient fuel to the successive combustion chambers.

16. The reformer apparatus of claim 15, wherein the successive reforming chambers contain small or crushed catalyst particles.

17. The reformer apparatus of claim 15, wherein the at least one printed heat exchanger transfers heat through a crossflow arrangement.

18. The reformer apparatus of claim 15, further comprising a quench heat exchanger which cools at least one of the streams exiting the printed circuit reformer.

19. A multiple adiabatic bed reformer, comprising a series of plates bonded together,
    each plate having several groups of openings therein for combustion and several groups of openings therein for reformation, and
    at least one plate has etched thereon at least one set of microchannels interconnecting one or more combustion openings of said several groups of openings within the at least one plate;

wherein across the series of plates bonded together
    (i) individual combustion openings, of said several groups of openings from one plate in said series of plates, are aligned with individual combustion openings, of said several groups of openings of at least one other plate in said series of plates, to define a series of combustion chambers for receiving and retaining a replaceable combustion catalyst; and
    (ii) individual reformation openings, of said several groups of openings from one plate in said series of plates, are aligned with individual reformation openings, of said several groups of openings of at least one other plate in said series of plates, to define a series of reformation chambers for receiving and retaining a replaceable reforming catalyst; and wherein the at least one set of microchannels is configured to distribute a predetermined and precise amount of low pressure fuel to at least a portion of the series of combustion chambers and the at least one set of microchannels are designed such that fuel may achieve laminar flow and the supply of fuel to each successive combustion chamber diminishes.

* * * * *